United States Patent
Phillips et al.

(10) Patent No.: US 12,277,654 B2
(45) Date of Patent: Apr. 15, 2025

(54) SYSTEMS AND METHODS FOR PINNING CONTENT ITEMS TO LOCATIONS IN AN AUGMENTED REALITY DISPLAY BASED ON USER PREFERENCES

(71) Applicant: Adeia Guides Inc., San Jose, CA (US)

(72) Inventors: Christopher Phillips, Hartwell, GA (US); Reda Harb, Issaquah, WA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 17/898,649

(22) Filed: Aug. 30, 2022

(65) Prior Publication Data

US 2024/0071001 A1 Feb. 29, 2024

(51) Int. Cl.
G06T 19/00 (2011.01)
G06F 3/01 (2006.01)
G06F 3/16 (2006.01)

(52) U.S. Cl.
CPC ............ *G06T 19/006* (2013.01); *G06F 3/011* (2013.01); *G06F 3/165* (2013.01)

(58) Field of Classification Search
None
See application file for complete search history.

(56) References Cited

U.S. PATENT DOCUMENTS

| | | | |
|---|---|---|---|
| 6,233,389 B1 | 5/2001 | Barton et al. | |
| 7,119,819 B1 | 10/2006 | Robertson et al. | |
| 7,721,303 B2 | 5/2010 | Alves et al. | |
| 9,392,212 B1* | 7/2016 | Ross | G06T 19/006 |
| 9,826,279 B2 | 11/2017 | Putterman et al. | |
| 10,137,361 B2 | 11/2018 | Perry | |
| 10,210,664 B1 | 2/2019 | Chaturvedi | |
| 10,466,794 B2 | 11/2019 | Maeda et al. | |
| 10,565,761 B2 | 2/2020 | Deluca et al. | |
| 10,620,825 B2* | 4/2020 | Liu | G06F 1/1686 |
| 10,684,485 B2 | 6/2020 | Stafford et al. | |
| 10,839,603 B2 | 11/2020 | Wang et al. | |
| 10,909,761 B1 | 2/2021 | Reid et al. | |
| 10,930,076 B2 | 2/2021 | Bastov et al. | |
| 11,024,064 B2 | 6/2021 | Muhsin et al. | |
| 11,036,364 B2 | 6/2021 | Zurmoehle et al. | |
| 11,087,563 B2 | 8/2021 | Zurmoehle et al. | |
| 11,120,612 B2 | 9/2021 | Richter et al. | |
| 11,249,714 B2 | 2/2022 | Spivack et al. | |
| 11,321,411 B1 | 5/2022 | Luan et al. | |
| 11,402,871 B1 | 8/2022 | Berliner et al. | |
| 11,467,656 B2 | 10/2022 | Spivack | |
| 11,804,014 B1 | 10/2023 | Casaburo et al. | |

(Continued)

OTHER PUBLICATIONS

U.S. Appl. No. 17/898,650, filed Aug. 30, 2022, Christopher Phillips.

*Primary Examiner* — Amare Mengistu
*Assistant Examiner* — Sarvesh J Nadkarni
(74) *Attorney, Agent, or Firm* — Haley Guiliano LLP

(57) ABSTRACT

A number of zones are defined within a location, each zone corresponding to a different physical area within the location. A weighting factor is then assigned to each zone. A number of content items are identified for display in the AR display based on user preferences. Using the weighting factors and content item priority data determined from user preference data, each content item is assigned to a zone. The AR display then renders the content items in each zone.

22 Claims, 13 Drawing Sheets

(56) References Cited

U.S. PATENT DOCUMENTS

| | | |
|---|---|---|
| 11,948,263 B1 | 4/2024 | Rudman et al. |
| 2011/0320529 A1 | 12/2011 | Mentchoukov et al. |
| 2012/0188279 A1 | 7/2012 | Demaine |
| 2012/0200600 A1 | 8/2012 | Demaine |
| 2012/0278722 A1 | 11/2012 | Raleigh et al. |
| 2014/0168262 A1* | 6/2014 | Forutanpour ......... G06T 19/006 345/633 |
| 2014/0368532 A1 | 12/2014 | Keane et al. |
| 2015/0015608 A1* | 1/2015 | Park ....................... G06F 3/012 345/633 |
| 2015/0046296 A1 | 2/2015 | Hart |
| 2015/0092673 A1 | 4/2015 | Singh et al. |
| 2015/0145887 A1 | 5/2015 | Forutanpour et al. |
| 2015/0205494 A1 | 7/2015 | Scott et al. |
| 2015/0278595 A1 | 10/2015 | Momoki et al. |
| 2016/0048204 A1 | 2/2016 | Scott et al. |
| 2016/0063762 A1 | 3/2016 | Heuvel et al. |
| 2016/0225086 A1 | 8/2016 | Seitz |
| 2016/0266386 A1 | 9/2016 | Scott et al. |
| 2016/0343168 A1 | 11/2016 | Mullins et al. |
| 2017/0256096 A1 | 9/2017 | Faaborg et al. |
| 2018/0070113 A1 | 3/2018 | Phillips et al. |
| 2018/0070119 A1 | 3/2018 | Phillips et al. |
| 2018/0173315 A1 | 6/2018 | Hall et al. |
| 2018/0174195 A1 | 6/2018 | Agarwal |
| 2019/0005724 A1* | 1/2019 | Pahud ..................... G06F 3/011 |
| 2019/0124466 A1 | 4/2019 | Masterson et al. |
| 2019/0128676 A1 | 5/2019 | Naik et al. |
| 2019/0172262 A1 | 6/2019 | McHugh et al. |
| 2019/0197785 A1 | 6/2019 | Tate-Gans et al. |
| 2019/0238928 A1 | 8/2019 | Filmeyer |
| 2019/0258365 A1 | 8/2019 | Zurmoehle et al. |
| 2019/0340821 A1 | 11/2019 | Chen et al. |
| 2019/0377487 A1 | 12/2019 | Bailey et al. |
| 2020/0035203 A1 | 1/2020 | Kosik et al. |
| 2020/0135141 A1 | 4/2020 | Day et al. |
| 2020/0159011 A1 | 5/2020 | Rakshit et al. |
| 2020/0160602 A1* | 5/2020 | Ghatak ............... G06Q 30/0255 |
| 2020/0201514 A1 | 6/2020 | Murphy et al. |
| 2020/0219023 A1 | 7/2020 | Duchastel |
| 2020/0249819 A1 | 8/2020 | Berquam et al. |
| 2020/0320794 A1 | 10/2020 | Huang et al. |
| 2020/0374498 A1 | 11/2020 | Sodhi et al. |
| 2021/0084360 A1* | 3/2021 | Patel ................... H04N 21/4312 |
| 2021/0097775 A1 | 4/2021 | Zurmoehle et al. |
| 2021/0209676 A1 | 7/2021 | Deol |
| 2021/0248831 A1 | 8/2021 | Tate-Gans et al. |
| 2021/0263624 A1 | 8/2021 | Zurmoehle et al. |
| 2021/0286504 A1* | 9/2021 | Moore ................. H04N 21/482 |
| 2021/0352374 A1 | 11/2021 | Filmeyer |
| 2022/0075517 A1 | 3/2022 | Bailey et al. |
| 2022/0101612 A1 | 3/2022 | Palangie et al. |
| 2022/0292788 A1 | 9/2022 | Huang et al. |
| 2022/0293065 A1 | 9/2022 | Day et al. |
| 2022/0326967 A1* | 10/2022 | Khan .................... G06T 19/006 |
| 2022/0345757 A1 | 10/2022 | Phillips et al. |
| 2022/0413785 A1 | 12/2022 | Lambert et al. |
| 2023/0020454 A1 | 1/2023 | Shchur |
| 2023/0040610 A1 | 2/2023 | Buerli et al. |
| 2023/0092282 A1 | 3/2023 | Boesel et al. |
| 2023/0102820 A1 | 3/2023 | Ma et al. |
| 2023/0139626 A1 | 5/2023 | Berliner et al. |
| 2023/0146677 A1 | 5/2023 | Woo et al. |
| 2023/0222737 A1* | 7/2023 | Yalawarmath ......... G06Q 10/10 345/419 |
| 2023/0237192 A1 | 7/2023 | Kahan et al. |
| 2023/0334795 A1* | 10/2023 | Berliner ............... G06V 10/235 |
| 2023/0336865 A1 | 10/2023 | Da Veiga et al. |
| 2023/0367386 A1 | 11/2023 | Wilson et al. |
| 2023/0386154 A1 | 11/2023 | Tate-Gans et al. |
| 2024/0005623 A1 | 1/2024 | Cooper et al. |
| 2024/0039905 A1 | 2/2024 | Talavera |
| 2024/0045207 A1 | 2/2024 | Singh et al. |
| 2024/0061547 A1 | 2/2024 | Fleizach et al. |
| 2024/0071002 A1 | 2/2024 | Phillips et al. |
| 2024/0073469 A1 | 2/2024 | Phillips |
| 2024/0087248 A1 | 3/2024 | Phillips et al. |
| 2024/0087256 A1 | 3/2024 | Hylak et al. |
| 2024/0094882 A1 | 3/2024 | Brewer et al. |
| 2024/0103712 A1 | 3/2024 | Ravasz et al. |
| 2024/0104864 A1 | 3/2024 | Mulliken et al. |
| 2024/0112428 A1 | 4/2024 | Levi et al. |
| 2024/0119682 A1 | 4/2024 | Rudman et al. |
| 2024/0212272 A1 | 6/2024 | Temple et al. |

* cited by examiner

500

502 — Define a plurality of zones corresponding to different physical areas within a location

504 — $N = 1$; $T_Z$ = number of zones

506 — Assign a weighting factor to each zone

508 — $N = T_Z$?

510 — No → $N = N+1$

Yes ↓

512 — Identify, based on user preference data, a plurality of content items to be displayed in the AR display

514 — $K = 1$; $T_C$ = number of content items

516 — Assign the $K^{th}$ content item to a respective zone of the plurality of zones based on a priority level of the $K^{th}$ content item and the weighting factors

518 — $K = T_C$?

520 — No → $K = K+1$

Yes ↓

522 — Generate for display, in the AR display, each content item of the plurality of content items in the zones to which they are assigned

FIG. 5

SYSTEMS AND METHODS FOR PINNING CONTENT ITEMS TO LOCATIONS IN AN AUGMENTED REALITY DISPLAY BASED ON USER PREFERENCES

BACKGROUND

This disclosure is directed to augmented reality displays. In particular, techniques are disclosed for assigning content items to zones within an augmented reality display based on user preferences.

SUMMARY

Predetermined configurations or compact layouts may not be appropriate when users are consuming content via an augmented reality (AR) headset or smart glasses. Considering the field of view (FoV) is already small for AR devices today, placing multiple screens within the same field of view as a single spatial anchor will result in a poor quality of experience (QoE) for the user due to the extremely augmented viewport display size. This disclosure is focused on defining zone areas within a spatially mapped room. Multiple AR and/or physical devices can be assigned to a spatial zone. There can be layouts for the AR virtual displays defined specifically for each zone. Each zone can have its own policies for the display group including layout, genre, channel guide filtering, FoV QoE or quality of service (QoS), time-shifted TV (TSTV), and video on demand (VOD). There may also be policies for loading default zone layouts or automatic zone relocation and layouts within the zone based on changes in the user's seated position within the spatially mapped room and more.

There has been a push by content providers to launch their services on AR headsets. For example, DirectTV Now showed a demonstration of its app on the Magic Leap AR headset. The demonstration showed how a user wearing the AR headset can watch up to four programs simultaneously. Additionally, the app allows users to change the size of the spatial screens as well as their placement within the user's FoV. Gazing at a particular spatial screen enables the audio to be played from that screen, while the audio from the rest of the spatial screens is automatically muted. The demo also showed users controlling the viewing experience by using a spatial programming guide.

The use of spatial anchors or persistent cloud anchors to build spatially aware mixed reality applications is known in the art. In fact, many companies provide managed services and SDKs to developers to create applications where users can "anchor" digital content to actual locations (e.g., longitude and latitude) or to spatial coordinates describing a location in three-dimensional space relative to a reference position. Such anchors can be resolved (via resolve requests) later (e.g., another day). The creation of an anchor requires the use of a three-dimensional feature map of the space and assigning an ID, which is later used to fulfill a resolve request.

Multi-view is a feature that allows users to watch multiple programs (e.g., four NFL games) simultaneously. Users can choose from predetermined configurations such as dual, thumbnail, quad, etc. Different streams can be displayed in different regions within each layout. U.S. Pat. No. 9,826,279, for example, discloses a technique that permits a user to display a broad spectrum of media content in separate windows of an interface displayed on the television. However, such predetermined configurations or compact layouts may not be appropriate when users are consuming content via an AR headset or smart glasses.

In one embodiment of the present invention, users can create their own layout, that persists so that it can be resolved later. Users can make layouts available for other devices and/or share them with specific profiles associated with a service, such as an OTT video service, by making the anchor "public." This setting allows a user to define the size and placement of the spatial screens, associate them with a specific app that can be accessed via the AR smart glasses (e.g., DirectTV Now, Cheddar, etc.), as well as associate specific channels and/or content genre (e.g., ports, news, NBC, CBS, Fox, ABC, etc.) to such layouts. It is important to note that layouts can also be assigned to "zones" within a spatially mapped environment. A zone is defined as an area within the spatially mapped environment (e.g., a house, an apartment, a classroom, etc.). For example, Zone A can be assigned to a location within the living room, while Zone B can be assigned to a location within the kitchen. Layouts can be assigned to zones as well, and the detection/identification of a zone allows the automatic resolving of the anchors associated with such zone. Zones can also allow multiple users to consume content in the same space while facing different zones.

In one embodiment, layouts can be created/saved while the user is watching TV. For example, a user who is watching four different streams in AR might decide to save the layout for later use. Since the current streams are mapped to current spatial screens/screen IDs, the saved layout can use metadata about the existing setup to create a unique anchor ID (as will be described later). An example of metadata is the channel associated with the stream that is displayed in the upper left corner of the user's field of view. If the channel is a news channel, then such channel is always displayed in the spatial screen in that location. A football game might be displayed in the upper right corner of the user's field of view, and therefore, that spatial screen can then be dedicated to future football games on this channel or can be tied, for example, to any game from any channel that feature that user's favorite team (e.g., the game might feature the user's favorite team as marked in the preferences section of the service).

All such layouts are created and maintained by managed services and a supported SDK that is installed on the user's augmented reality headset, while anchors may be hosted in the cloud or stored locally on an AR device. More specifically, each layout has its own unique anchor ID, and is associated with additional metadata as will be disclosed below (e.g., time of day, day of the week, triggers based on real-time data update such as a score change, etc.). The ID of any anchor is associated with the feature map of the actual physical place, which is later used to resolve the anchor (e.g., by using feature of a scene to compare/match with the saved feature map). However, as mentioned earlier, there are additional conditions (e.g., time of day) that result in the resolve of any particular anchor.

In another embodiment, a layout can be associated with a category (e.g., news). For example, if such layout is associated with three spatial screens and assigned to news category, then three news channels or video streams (including VOD content) are displayed within such layout/spatial screens. The source of such metadata (channels, genre, etc.) is from the electronic programming guide (EPG) associated with the service. Users can also create a dedicated layout for notifications (e.g., app notifications).

Users can choose any of their layouts as a default layout. This allows the automatic resolve and display of such layout within the spatially mapped environment (e.g., room) when the users access the video service through their AR headsets.

In some embodiments, a user's profile can include multiple default layouts. For example, a default layout can be based on the time of the day. A user might prefer to watch the news in the morning while having breakfast but watch multiple football games on Sunday. Therefore, the appropriate layout/spatial screens are automatically resolved (appropriate streams are routed to the spatial screens) based on such predefined preferences. Another default layout may be based on the user's seated position in the room. If the user is sitting in one location and sets up zones in the room, these zones may not be ideal for another seated position. If the user relocates to another seated position, a default zone location could be changed based on that seated position. This also could be automatic. Within the spatially mapped room, the device knows the exact location of the zones and where the user is seated (e.g., using a combination of the device's IMU (Inertial Measurement Unit) sensor, camera sensors and other sensors including LiDAR if equipped). If no default location is made for a seated position, the system will automatically relocate zones and all devices within the zone to another location for optimal viewing for that seated position. The user can also relocate or fine-tune the automatically relocated zones. The zones can then be saved for the new viewing location. Anytime the user changes their location within the room, the zones will be optimally positioned based on where the user is located within the spatially mapped room.

The user can, in some embodiments, configure a portion of a layout to display content other than video streams. For example, the source of content for that portion can be tied to a stocks API that retrieves real-time stocks data. Additionally, the source of the data can be an actual app that is installed on the headset, such as a social network app where the most recent posts on the user's wall are displayed. Such portion (spatial screen with a specific size and location) can be displayed in response to an update in the real-time data (e.g., the user's recent social network post received a new like or a new comment). This acts as an alert to the user since the sudden appearance of the spatial screen can grab the user's attention especially if it is displayed in a central portion of his field of view.

In an embodiment, users can configure app data (e.g., sports app with real-time scores of various sports) to be displayed in a spatial screen in response to an event (e.g., a score change). This is different from configuring a portion of a layout to display such data, since this would be separate, and its rendering would be independent of the rendering of any layout.

The metadata of the anchor can be managed and updated at any time by the user. For example, the user might make the anchor public or private, change its location within the spatially mapped environment, and change the triggers associated with its rendering, etc. If the event happened on either the physical TV or an AR virtual TV the user is not looking at, the content can be automatically changed to time-shifted on that physical or AR virtual television and automatically time-shifted back to just prior to when the score happened. As used herein, time-shifted means that the AR content being displayed will be paused and/or recorded when the AR content is not currently in the field of view of the user. Similarly, the features of live TV control can be used when the user looks at the AR screen associated with that content (e.g., when the user gaze at the spatial screen associated with that event, the stream is rewound to the start of the event. More specifically, an occurrence of an event (a touchdown) is associated with a corresponding portion of the content being streamed or broadcasted, a spatial screen (ID), and at least the beginning of the event. For example, the beginning of an event that results in a touchdown can be the time at which the quarterback throws the football for that particular play. While identification of key game plays is outside the scope of this invention, the current systems rely on existing technologies and/or services that make this data available to the streaming service. Live TV control is known in the art and can be enabled on a local device (e.g., disk drive of a DVR) or can be cloud-based. For example, U.S. Pat. No. 6,233,389 teaches a commonly practiced technique for live TV control.

An AR indicator can be placed in the headset notifying the user of the score and direct the user to look at either the physical or virtual television broadcasting the service on which the score took place. Once the automatic time-shifted device comes into view, the replay of the event will automatically happen. The user can then be automatically taken to live or remain in time-shift mode behind the live broadcast content. In one embodiment, the AR indicator has a direction (e.g., points right, left, back, etc.). This is helpful when multiple spatial screens are in use. Other techniques can be used to notify the user. For example, the notification can appear on the right side of the user's field of view, which indicates that the spatial screen is on the right. Additionally, if multiple spatial screens are present, then a border or a special indicator can be used to allow the user to easily identify the spatial screen.

Time-shifting and VOD pause can also be applied to a zone. Any AR virtual TV or physical TV assigned to a zone that is dedicated for time-shift or VOD pause will automatically be time-shifted or paused when the devices in the zone fall into the field of vision.

The QoE can be determined based on the number of times the user watches the physical or AR virtual display device. If the user has primarily been watching some physical or AR virtual devices more than others, the quality given to the devices the user is primarily watching can be fixed for a period of time unless the user's behavior changes and the user begins to watch another device more. This can be based on the amount of time the user watches the physical TV/device or the AR virtual TV. It can also be the number of times the user holds their gaze to watch an individual physical TV/device or AR virtual TV. This can also be based on the grouping mentioned above where the quality of the entire group will remain constant based on the same policies as with the individual physical TV/device or AR virtual TV. A mix of physical and AR virtual TVs can coexist within the same spatial grouping, and the weighting factor for the entire group will change based on time viewed.

In other embodiments, an AR virtual TV/display device can be moved from one zone to another. A user can be watching news in the news category on an AR virtual device. That device can be selected and "grabbed" or "pinched" in the AR context. While the device is "grabbed" or "pinched," it can be moved to another zone or space. An example is a user is watching news on an AR virtual device which is located in the news zone or spatial area. The user can select the AR virtual display/TV and relocate it to the TSTV/VOD zone. If the channel or program is licensed for TSTV, the AR virtual display TV/device will be relocated to the new TSTV/VOD zone and FoV-based play/pause will be enabled for that AR virtual display/TV. The content will automatically get the weighting factor that is assigned to that zone.

Systems and methods are described herein for automatically displaying content items in predetermined locations in an AR display. A number of zones are defined within a location, each zone corresponding to a different physical area within the location. A weighting factor is then assigned to each zone. The weighting factor may be assigned to a zone based on a location of the zone within a field of view of the AR display. For example, a zone that is centered within the field of view may be assigned a higher weighting factor (e.g., 2), while a zone that is located in a peripheral area, or in an area that requires a user of the AR display to turn their head to bring the zone into view, may be assigned a lower weighting factor (e.g., 0.5). Weighting factors may also be assigned based on user inputs. For example, a user may interact with the AR display, such as through gestures captured by the AR display device, or through inputs on a physical input device or touchscreen, or voice commands. Through user preference data, a number of content items are identified for display in the AR display. The user preference data includes identifiers of the content items as well as priority data for each content item. The priority data may be calculated based on content consumption history for the same or similar content items, user content ratings, social media activity, or any other data source. Using the weighting factors and the priority data, each content item is assigned to a zone. The AR display then renders the content items in each zone.

To assign a content item to a zone, a priority level of the content item may be retrieved from the priority data. In some cases, the priority data includes a priority level value, while in other cases the priority level must be calculated based on a number of factors contained in the priority data, such as those mentioned above. The priority level of the content item is then compared to the weighting factor of each zone. In some embodiments, the weighting factor and the priority level may not be directly comparable. For example, the priority level may be based on non-numerical rating system, or on a different numerical rating system than the weighting factors. In such cases, the priority level and weighting factors must be scaled to a common numerical range so that they can be compared. A first scale is generated based on the highest and lowest priority levels of the content items (e.g., a scale from 0 to 5). A second scale is generated based on the weighting factors of all zones (e.g., a scale from 0.5 to 2). A scaled value for the priority level of the content item can then be calculated based on the first scale. Similarly, a scaled value for each weighting factor can be calculated using the second scale. To calculate a scaled value using either scale, the difference between the highest and lowest values on the scale is calculated. The raw value to be scaled is then multiplied by the inverse of the difference. For example, using a scale from 0 to 5, a priority level of 4 yields a scaled priority level of 0.8. The difference between maximum and minimum values of the scale is 5. Multiplying 4 by ⅕ gives a scaled value of 0.8. Likewise, a weighting factor of 0.75 on a scale from 0.5 to 2 results in a scaled weighting factor of 0.5. The difference between the maximum and minimum values of the scale is 1.5, and multiplying 0.75 by 1/1.5 results in a scaled value of 0.5. These two scaled values can then be directly compared to determine whether a priority level matches, or is within a threshold deviation of, a weighting factor. If so, a zone to which the matching weighting factor is assigned is selected and the content item is assigned to that zone.

Content items may include episodes of a series, movies, news programs, e-books, video games, social media interfaces, messaging and email interfaces, video chat interfaces, or any other suitable entertainment content, as well as informational content, such as electronic program guides (EPGs) or other content selection menus. Some zones may be categorized by content type, and content may be assigned to each zone based on category. For example, a zone may be categorized as related to sports content. If a sports-related content item is to be displayed, it may be assigned to this zone. An EPG filtered by sports content may also be assigned to this zone. Additionally, based on content consumption history, it may be determined that the user often watches sports content in a group watch setting. A messaging or video chat interface may therefore also be assigned to this zone. In some cases, these interfaces may initially be displayed in a minimized or non-prominent manner so that the maximum available area of the zone may be dedicated to the sports content assigned to the zone. The user may select or gesture to an interface to bring it into focus, enlarge it, otherwise enable interaction with the interface. Other content items displayed in the zone may be scaled down to keep the content items within the area of the zone.

Each zone may be defined by a distance, in each direction, from an anchor point in the location. Content items may be placed within the zone at different distances from the anchor point. The distance from the anchor point may be based on the priority level of the content item. For example, if a zone has a scaled weighting factor of 1 and three content items have scaled weighting factors of 0.9, 1, and 1.1, respectively, all three content items may be assigned to this zone. The content item having the highest priority level within the zone (i.e., priority level 1.1) may be placed at or near the anchor point, while other content items are placed farther from the anchor point based on priority level in descending order. For a categorized zone, priority levels of content items may vary more widely. In some embodiments, EPG content is assigned a low priority level so that it does not disrupt consumption of content items in a zone, and may be displayed prominently only in response to user interaction with the EPG. In other embodiments, if all content items assigned to a zone are short (e.g., 10-15 minutes), or if the content consumption history of the user suggests that the user often changes which content to display in that zone, the EPG may be assigned a higher priority level and/or displayed more prominently.

Movement of the AR display device may be detected (e.g., using inertial measurement units, accelerometers, gyroscopes, compass data, GPS data, etc.) and the field of view of the AR display adjusted accordingly. If a zone moves out of the field of view (either partially or completely), content displayed in the zone may be paused. Some zones may be designated by the user as time-shift zones. In some embodiments, content displayed in a zone will be paused only if the zone is designated as a time-shift zone. Content displayed in a time-shift zone may also be recorded when the zone is not in the field of view of the AR display if the content is live streaming or broadcast content (i.e., not VOD content). When the zone is detected as moving back into the field of view, the content may be resumed. If the content was recorded, playback of the recorded portion begins automatically when the zone moves back into the field of view. Recording of the content continues as long as recorded portions of the content are being played back. Once playback of the content item reaches a position corresponding to the live or broadcast content, recording is stopped, and playback continues from the live stream or broadcast.

In some embodiments, a zone may be assigned to a physical area that includes a display device, such as a TV. Assignment of content items to this zone may be prevented, and the zone assigned the highest weighting factor. This allows additional content to be displayed on the display device and prevents obstruction of that content by the AR display. In some cases, the user may subsequently choose to manually relocate or assign a content item to this zone. The user may be presented with a warning or other notification requesting confirmation that they wish to assign content to that zone before allowing the assignment to proceed.

In some embodiments, display of all content items in all zones begins without any audio output. In other embodiments, audio of the highest-priority content item in the highest-priority zone is output first. A target zone on which the user is focused is then determined. For example, the user's gaze or the position of a zone within the AR display (e.g., distance of a zone from the center of the AR display) may be used to determine that the user is focused on a specific zone. If the zone on which the user is focused changes, audio of content in the target zone is activated and audio of content in all other zones is deactivated. Audio of the highest-priority content in the target zone may be activated first. The user may select which of multiple content items within the zone to listen to. In response, the corresponding audio will be activated, and others will be deactivated.

In some embodiments, a user may set up different AR display configurations. Each AR display configuration may be associated with one or more of a location, a time of day and a type of content. A location is mapped to identify a number of zones, and content items are identified for assignment to the zones. Selections of zones for each content item may be received from the user, or content items may be assigned to zones automatically as described above. Identifiers of each content item and indicators of the selected zone for each content item are then stored as an AR display configuration associated with the location. In response to detecting that the AR display device is being used at the location (e.g., the AR display device is powered on and being worn by a user), the AR display configuration is retrieved and resolved on the AR display device. The user manually selects the AR display configuration when the AR display device is being used in other locations or may associate the AR display configuration with other locations. Similar actions may be taken for each location at which the AR display device is used, allowing the user to associate different configurations with different locations. The features described in this disclosure may be made available on the AR device only when being used in a media consumption mode. These features may not be necessary for other modes of operation of the AR device and may not be made available in those mode to reduce power consumption and processor loads.

The user may also associate an AR display configuration with a time of day. When the AR device is detected as being used, the current time is compared with a time window for each AR display configuration. If the current time falls within the time window of an AR display configuration, that configuration is retrieved and resolved on the AR display device. If, while the AR display device is in use, the end of a first time window associated with a first AR display configuration is reached and a second time window associated with a second AR display configuration begins at the same time, display of the first AR display configuration may be ended and the second AR display configuration may be retrieved and resolved. In some embodiments, a notification may be generated for output to the user that the second AR display configuration is associated with the current time. The user may then choose, through interaction with the notification, to keep the first AR display configuration or to switch to the second AR display configuration.

Some AR display configurations may be stored in association with a category of content. It may be determined, based on content consumption history of the user, that a the user consumes a particular category of content at the current time of day, day of the week, or current location. The AR display configuration associated with the category may then be retrieved and resolved.

BRIEF DESCRIPTION OF THE DRAWINGS

The above and other objects and advantages of the disclosure will be apparent upon consideration of the following detailed description, taken in conjunction with the accompanying drawings, in which:

FIG. 5 is a flowchart representing an illustrative process for generating an AR display configuration for display in an AR display, in accordance with some embodiments of the disclosure;

DETAILED DESCRIPTION

Figure 1:
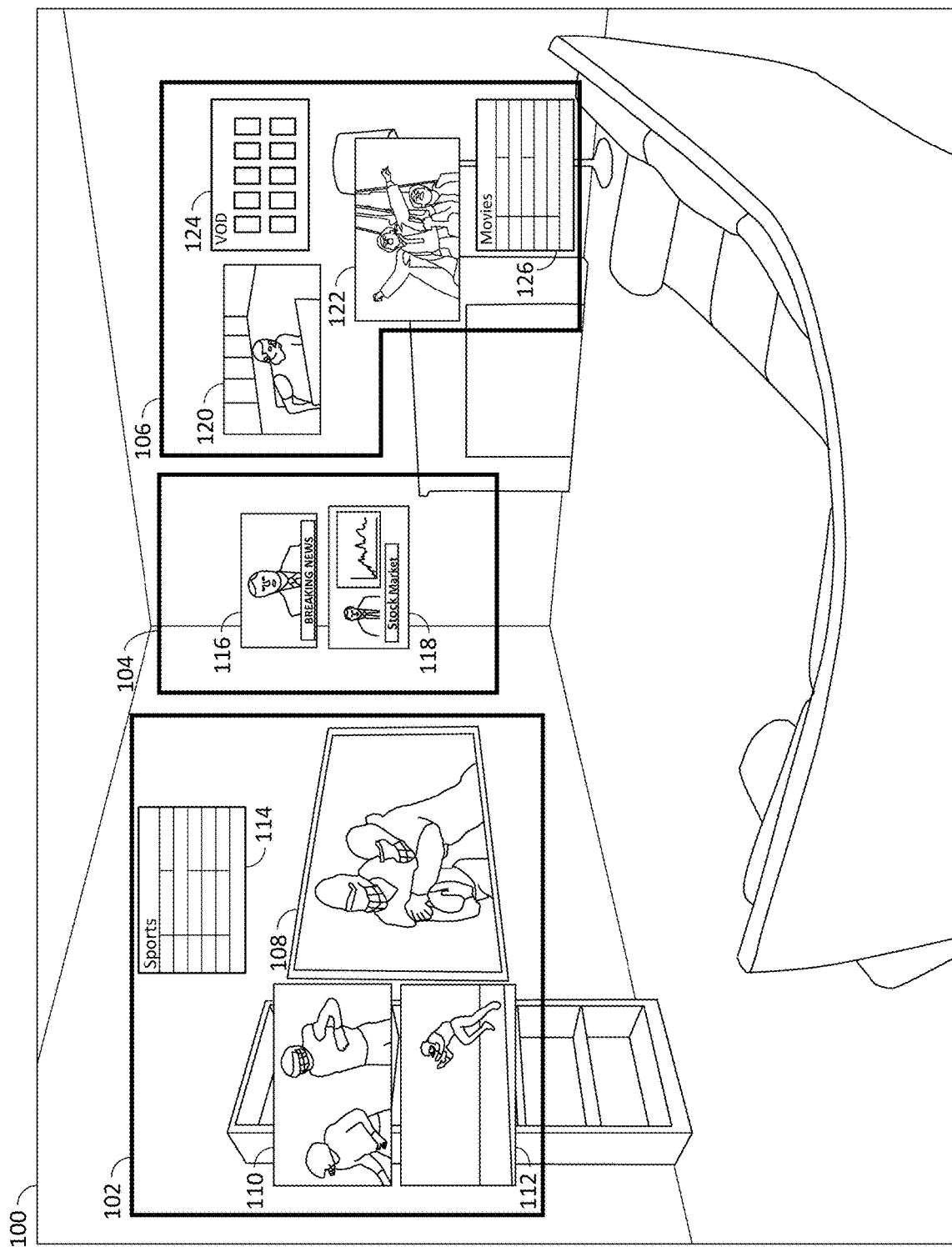
FIG. 1 shows an illustrative example of an AR display configuration, in accordance with some embodiments of the disclosure.

FIG. 1 shows an illustrative example of an AR display configuration, in accordance with some embodiments of the disclosure. The AR display device may map a location, such as a room in a house, to identify a number of zones in the location. The room may be mapped using imaging sensors, such as cameras, infrared sensors, light ranging sensors, and any other suitable sensors to fully map a three-dimensional space surrounding the AR display device. Zones within the location may be identified as areas within the mapped space that may be obstructed from the view of the user without endangering the user's ability to move around the location. For example, a piece of furniture in the middle of a room, such as a table, may not be suitable for obstruction, as the user may accidentally walk into the table. However, a bookshelf against a wall would be suitable for obstruction, as the user is not likely to walk into it. Doorways may also not be suitable for obstruction, as the user may need to be able to see what is happening in another room and may need to know where the exits to the room are in case of emergency.

During setup of an AR display configuration, zones may be identified in a 360-degree field around the AR display device, with only a subset of identified zones visible in a field of view of the AR display device at any one time. Field of view 100 includes three identified zones 102, 104, and 106. Zone 102 may be associated with sports. This association may be manually or verbally input by the user or may be determined based on content consumption history of the user. For example, zone 102 may include a physical display device 108, such as a 4K TV. The content consumption history of the user may indicate that the user often watches sports content on display device 108. Other sports-related content items 110 and 112 are therefore assigned to zone 102. Their placement within the zone is such that they do not obscure display device 108. EPG data 114 may also be displayed as a content item in zone 102. EPG data 114 is filtered to show only content related to the category with which zone 102 is associated, i.e., sports.

Zone 104 is centrally located within field of view 100. User preference data may indicate that the user likes to watch news programs. Accordingly, news content items 116 and 118 are assigned to zone 104. An anchor point for zone 104 may be located in the center of the zone. Content items 116 and 118 may be placed within zone 104 such that they are equidistant from the anchor point. In some cases, when multiple content items are to be placed in a zone, the position of a content item (e.g., its distance from the anchor point) may be based on a priority level of the content item. Higher-priority content items may be placed closer to the anchor point, while lower-priority content items may be placed farther from the anchor point. If additional space is needed to fit more content items into the zone, lower-priority content items may be displayed at a smaller size than higher-priority content items. When desired, a user can select to enlarge a lower-priority content item, either permanently or temporarily.

Zone 106 is associated with entertainment content (e.g., movies and TV shows). TV show 120 and movie 122 may therefore be assigned to zone 106. A VOD menu 124 of available content items (e.g., from a streaming service, a cable service provider, or a unified menu of content available from multiple providers or sources) may also be assigned as a content item to be displayed in zone 106, as well as EPG data 126, which is filtered to show only movies. As can be seen from the geometry of zone 106, zones may be any shape so as not to obscure areas of the location that should remain visible to the user, or that the user would like to remain visible.

Figure 2:
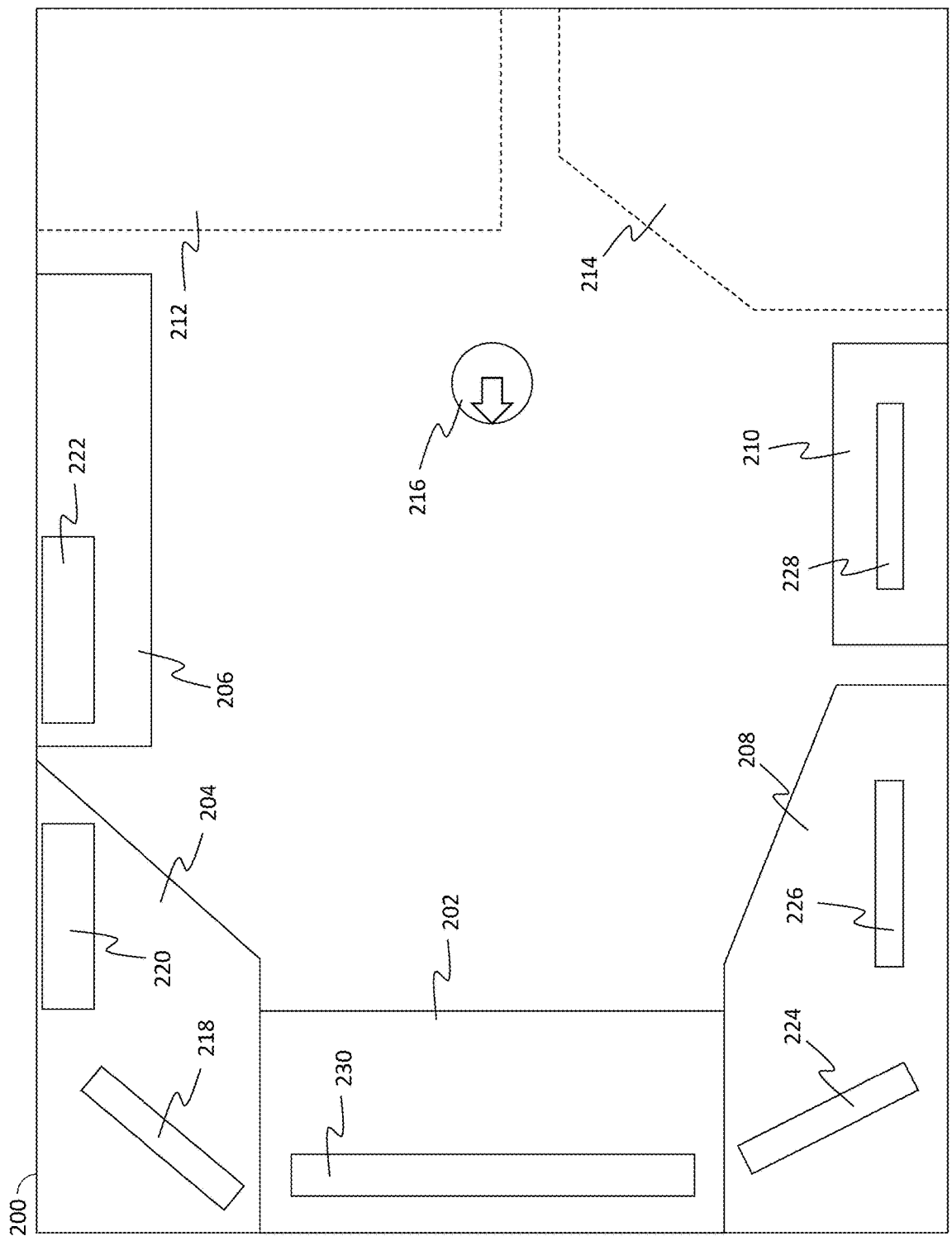
FIG. 2 shows an illustrative example of a plurality of zones displayed in an AR display configuration, each zone assigned to a different physical area, in accordance with some embodiments of the disclosure.

FIG. 2 shows an illustrative example of a plurality of zones displayed in an AR display configuration, each zone assigned to a different physical area, in accordance with some embodiments of the disclosure. Mapped location 200 includes seven zones 202, 204, 206, 208, 210, 212, and 214. Zone 202 includes a physical display device 230. Since display device 230 takes up the majority of space in zone 202, no content items may be assigned to that zone. Content items may be assigned to other zones in location 200. AR display device 216 may be located at a position within location 200 with a field of view centered on zone 202. Zones 212 and 214 are outside the field of view of AR display device. Accordingly, while content items may be assigned to those zones, they are not rendered by the AR display device. Content items assigned to zone 204 may be displayed in AR virtual TV displays 218 and 220. A content item assigned to zone 206 may be displayed in AR virtual TV display 222. Content items assigned to zone 208 may be displayed on AR virtual TV displays 224 and 226, and a content item assigned to zone 210 may be displayed on AR virtual TV display 228.

In some embodiments, a content item may be assigned to zone 202 for display on physical display device 230. Display device 230 may be a connected to a network. AR display device 216, or an associated application, may transmit an instruction to display device 230 to begin display of one or more assigned content items.

Figure 3:
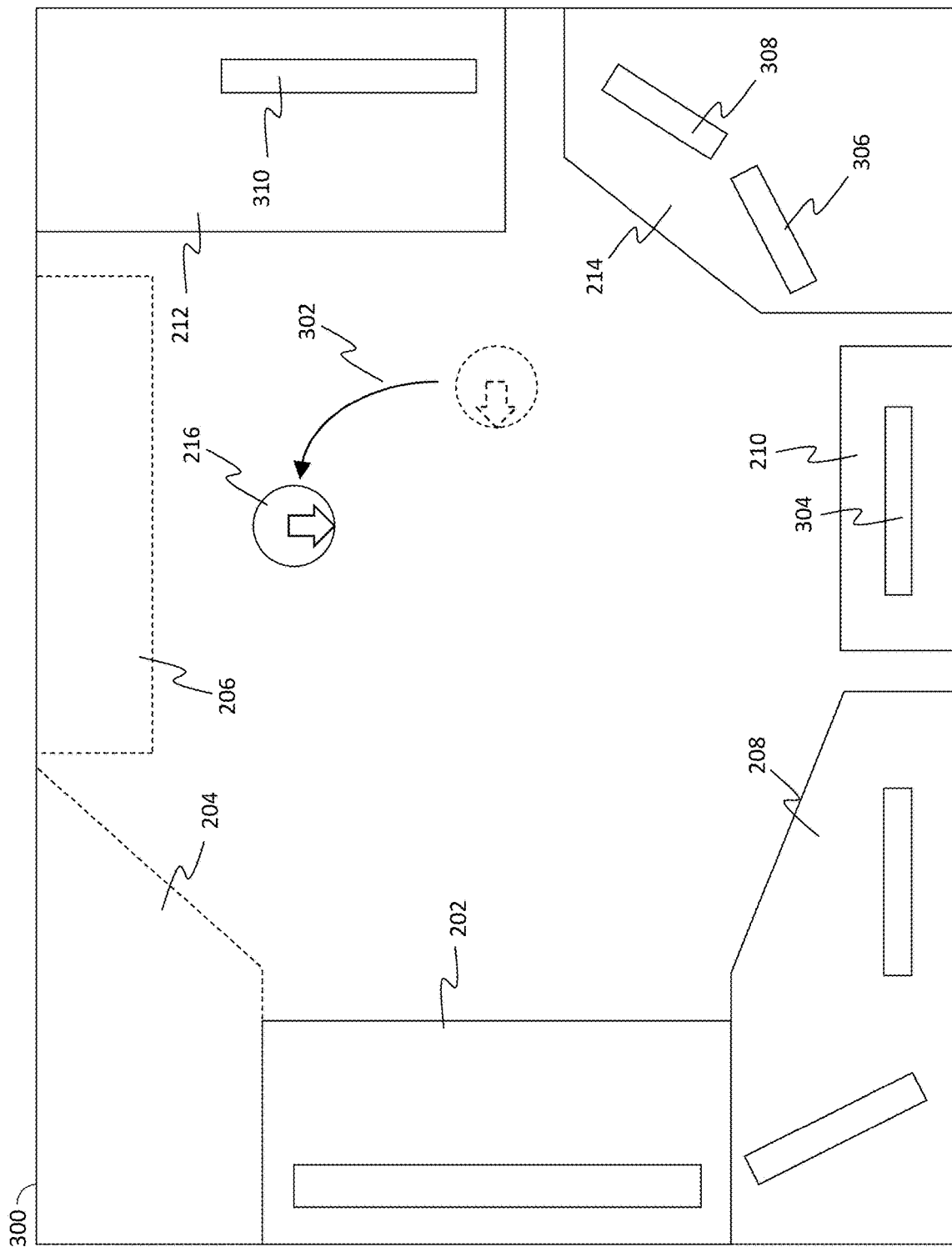
FIG. 3 shows an illustrative example of a different plurality of zones displayed in an AR display configuration based on movement of the AR display device, in accordance with some embodiments of the disclosure.

FIG. 3 shows an illustrative example of a different plurality of zones displayed in an AR display configuration based on movement of the AR display device, in accordance with some embodiments of the disclosure. AR display device 216 may move 302 to a new position within the location. Along with the changing position, the field of view may change as well. In the example of FIG. 3, not only has AR display device 216 moved to a new position, but it has also rotated such that zone 210 is now centrally located in the field of view. Zones 204 and 206 are no longer in the field of view of the AR display device and are therefore no longer rendered. If either zone 204 or zone 206 is indicated in user preferences or other settings for the AR configuration to be a time-shift zone, the content items assigned to that zone are paused or, if live broadcasts, recorded. Zones 212 and 214 are now within the field of view of AR display device 216. Content items assigned to zone 210 may be displayed on AR virtual TV display 304, and content items assigned to zone 214 may be displayed on AR virtual TV displays 306 and 308.

Figure 4:
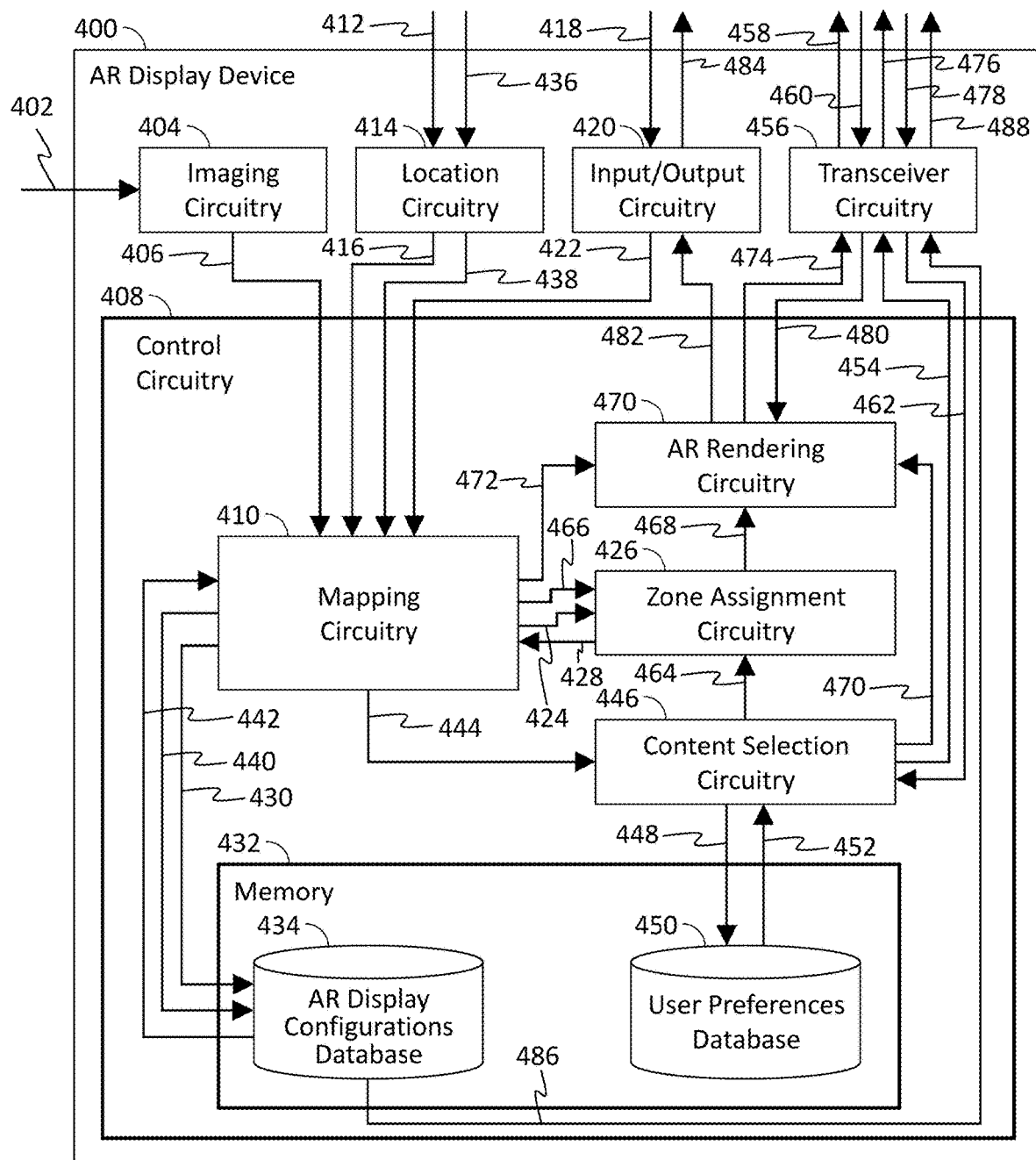
FIG. 4 is a block diagram showing components and data flow therebetween of an AR display device, in accordance with some embodiments of the disclosure.

FIG. 4 is a block diagram showing components and data flow therebetween of an AR display device in accordance with some embodiments of the disclosure. AR display device 400 may be a handheld device, such as a smartphone or tablet, or a head-mounted display unit such as smart glasses. AR display device 400 gathers 402 data representing the area surrounding AR device 400 using imaging circuitry 404. Imaging circuitry 404 may include one or more cameras, infrared sensors, LiDAR sensors, or other suitable devices for gathering three-dimensional data describing an environment. Imaging circuitry 404 transmits 406 the gathered imaging data to control circuitry 408, where it is received at mapping circuitry 410.

Control circuitry 408 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Mapping circuitry 410 processes the imaging data to identify objects, such as walls, doors, furniture, etc., in the area surrounding AR display device 400. This may be accomplished using any suitable methods for AR environment processing. Based on the positions of detected objects, mapping circuitry 410 identifies a plurality of zones. Each zone may be an area in which no significant objects are present. For example, mapping circuitry 410 may assign each object a significance factor, where objects that ought not be obscured from the view of the user, such as doors or objects placed in the middle of room that may pose a tripping hazard, are assigned a high significance factor, and objects that can be obscured are assigned a low significance factor. Mapping circuitry 410 may then identify areas that contain only low-significance objects as individual zones. If a large area, such as a long wall, contains no high-significance objects, mapping circuitry 410 may split the area into two or more zones. This may depend on the number of content items or categories of content items to be displayed in the AR display.

Location data is obtained 412 using location circuitry 414. Location circuitry 414 may include a GPS module, Wi-Fi positioning module, or other circuitry suitable for determining a location of AR display device 400. Location circuitry 414 may also include orientation detection circuitry such as a compass, gyroscope, accelerometer, inertial measurement unit, etc. Location circuitry 414 transmits 416 the location data to mapping circuitry 410. This allows mapping circuitry 410 to associate the mapped area with a geographic location.

To complete setup of an AR display configuration, input may be received 418 from a user at input/output circuitry 420. Input/output circuitry 420 may include a user interface device, such as a touchscreen interface or remote control. Input/output circuitry 420 may also include Wi-Fi or Bluetooth connection modules to interface with, and receive data from, other devices. Input/output circuitry 420 may further include video and audio driver circuitry or other output circuitry to enable output of content on the AR display. The received user input may include selections of content item or content categories that the user wishes to include in the AR display configuration. Input/output circuitry 420 then transmits 422 the user inputs to mapping circuitry 410. Mapping circuitry 410 may transmit 424 identifiers of the selected content items or content categories to zone assignment circuitry 426. Zone assignment circuitry 426 may allocate the selected content items or content categories to specific zones. The dimensions of a particular zone may be enlarged or reduced in order to best fit the number of content items assigned to a zone. If necessary, zone assignment circuitry 426 may request mapping circuitry 410 to identify additional zones to accommodate additional content categories or content items. When finished, zone assignment circuitry 426 transmits 428 the zone assignments for each selected content item or content category to mapping circuitry 410. Mapping circuitry 410 then transmits 430 the location data, identified zones, selected content items/categories, and zone assignments of the selected content items/categories to memory 432, where they are stored as an AR display configuration in AR display configurations database 434. Memory 432 may be an electronic storage device. As referred to herein, the phrase "electronic storage device" or "storage device" should be understood to mean any device for storing electronic data, such as random-access memory, read-only memory, hard drives, optical drives, solid state devices, quantum storage devices, or any other suitable fixed or removable storage devices, and/or any combination of the same.

When AR display device 400 is in use, location circuitry 414 may receive 436 location data describing the location at which AR display device 400 is being used. Location circuitry 414 transmits 438 the location data to mapping circuitry 410. Mapping circuitry 410 determines whether there is an AR display configuration associated with the location. Mapping circuitry 410 transmits 440 a request to AR display configurations database 434 for an AR configuration associated with the location. If an AR display configuration associated with the location exists, AR display configurations database 434 transmits 442 the AR display configuration to mapping circuitry 410. If no AR display configuration is associated with the location, a null response or other flag indicating that no AR display configuration is associated with the location is returned to mapping circuitry 410. If more than one AR display configuration is associated with the location, AR display configurations database 434 may return all relevant configurations, or may return an indication of the number of configurations. For example, a user may set up different AR display configurations at the same location for different times of day or different categories of content. If multiple configurations are returned to mapping circuitry 410, mapping circuitry 410 may identify a configuration associated with the current time, or may prompt the user to select a category of content. Mapping circuitry 410 then selects the appropriate AR display configuration. If a number of configurations is returned, mapping circuitry 410 may determine which configuration to use and transmit a second request to AR display configurations database 434 for the specific AR display configuration, which is then returned to mapping circuitry 410.

Once an AR display configuration has been selected, mapping circuitry 410 transmits 444 identifiers of the content items and/or content categories that are to be included in the AR display to content selection circuitry 446. If, for example, the AR display configuration includes a sports category, content selection circuitry 446 may determine which sports content to include based on user preferences. Content selection circuitry 446 may transmit a request to user preferences database 450, stored in memory 432, for information relating to the user's consumption of sports content. For example, consumption history data may be used to determine that the user prefers to watch, or habitually watches, football content related to a specific team or set of teams (e.g., NFL teams, college teams, etc.). User preferences database 450 transmits 452 the requested information to content selection circuitry 446. Content selection circuitry 446 then transmits 454 a request for EPG data to transceiver circuitry 456. Transceiver circuitry 456 comprises a network connection over which data can be transmitted to and received from remote devices, such as an ethernet connection, Wi-Fi connection, mobile broadband interface, or connection employing any other suitable networking protocol. Transceiver circuitry 456 transmits 458 the request to an EPG server or other data source and, in response, receives 460 a set of EPG data. Transceiver circuitry 456 transmits 462 the EPG data to content selection circuitry 446. Content selection circuitry 446 then identifies, using the EPG data, where content items in the selected category that match the user's preferences can be viewed. If a specific content item was selected by the user, such as a specific movie, specific news program, or specific content series, content selection circuitry identifies where those content items can be viewed based on the EPG data.

Once all content items to be included in the AR display have been identified, content selection circuitry 446 transmits 464 identifiers of the content items to zone assignment circuitry 426. Mapping circuitry 410 transmits 466 the indications of the zones included in the AR display configuration, and any user-defined preferences for each zone. Zone assignment circuitry 426 then assigns each content item to a specific zone. Zone assignment circuitry 426 then transmits 468 the content identifiers, in association with identifiers of the zones to which they have each been assigned, to AR rendering circuitry 470. Mapping circuitry 410 also transmits 472 the AR display configuration data, including identifiers of the zones and their positions within the mapped location (e.g., an anchor position and dimensions for each zone) to AR rendering circuitry 470. AR rendering circuitry 470 transmits 474 a request for each content item to transceiver circuitry 456. Each request includes an identifier of a content item and a URL or other location from which the content item is available that was determined from the EPG data. Transceiver circuitry 456 in turn transmits 476 each content item request to the specified URL or location and receives 478 a media stream for each requested content item. Transceiver circuitry 456 relays 480 each media stream to AR rendering circuitry 470. AR rendering circuitry 470 then resolves the AR display configuration by rendering each media stream in its assigned zone and generating for display the AR environment defined by the AR display configuration. AR rendering circuitry 470 then transmits 482 the rendered AR environment to input/output circuitry 420. Input/output circuitry 420 then outputs 484 the AR environment to the user on an AR display.

In some embodiments, the user may publish, or otherwise make available to other platforms, one or more AR display configurations. In response to a selection, command, or other input from the user, a specific AR display configuration may be transmitted 486 from AR display configurations database 434 to transceiver circuitry 456, along with a URL or other location to which the AR display configuration is to be shared. Transceiver circuitry 456 then transmits 488 the AR display configuration to the specified location.

FIG. 5 is a flowchart representing an illustrative process 500 for generating an AR display configuration for display in an AR display, in accordance with some embodiments of the disclosure. Process 500 may be implemented on control circuitry 408. In addition, one or more actions of process 500 may be incorporated into or combined with one or more actions of any other process or embodiment described herein.

At 502, control circuitry 408 defines a plurality of zones corresponding to different physical areas within a location. For example, control circuitry 408 may identify zones at different points in a room. The position and size of each zone may be based on the position of objects within the location. Certain objects may need to remain visible to a user during use of the AR display device for safety reasons, such as exits, windows, sources of danger such as a lit fireplace or other open flame, etc. At 504, control circuitry 408 initializes a counter variable N, setting its value to one, and a variable $T_Z$ representing the number of zones defined. At 506, control circuitry 408 assigns a weighting factor to each zone. For example, larger and more prominent zones may have higher weighting factors than smaller and less prominent zones. Other methods for assigning weighting factors to zones are discussed below in connection with FIG. 6. At 508, control circuitry 408 determines whether N is equal to $T_Z$, meaning that a weighting factor has been assigned to every zone. If N is not equal to $T_Z$ ("No" at 508), then, at 510, control circuitry 408 increments the value of N by one, and processing returns to 506.

If N is equal to $T_Z$ ("Yes" at 508), then, at 512, control circuitry 408 identifies, based on user preference data, a plurality of content items to be displayed in the AR display. For example, user preference data may indicate that the user prefers to watch new programs, football games, and science fiction movies. Using these preferences, control circuitry 408 may search EPG data and content catalogs of streaming platforms (e.g., Netflix) to find content items that match the user's preferences. More than one content item may be identified for each preferred content type or category.

At 514, control circuitry 408 initializes a counter variable K, setting its value to one, and a variable $T_C$ representing the number of content items to be displayed in the AR display. At 516, control circuitry 408 assigns the $K^{th}$ content item to a respective zone of the plurality of zones based on a priority level of the $K^{th}$ content item (which may be based on user preferences, user content consumption history, content availability windows, etc.) and the weighting factors of each zone. Methods for comparing content item priority levels with weighting factors are discussed below in connection with FIG. 7. User preference data may indicate a user-defined priority level for specific content items or categories of content. User content consumption history may indicate that the user consumes a specific type or category of content more often than other types of content. This may result in a higher priority level for the content type. At 518, control circuitry 408 determines whether K is equal to $T_C$, meaning that all content items have been assigned to a zone. If K is not equal to $T_C$ ("No" at 518), then, at 520, control circuitry 408 increments the value of K by one, and processing returns to 516. If K is equal to $T_C$ ("Yes" at 518), then, at 522, control circuitry 408 generates for display, in the AR display, each content item of the plurality of content items in the zone to which it is assigned. For example, control circuitry 408 requests a content stream for a content item. Control circuitry 408 renders video of the content item and transforms the viewing window of the rendered content item to fit into its assigned zone and be displayed according to the relative perspective as physical objects located in the zone. For example, if a wall is at a 45-degree angle to the user and a zone is placed over the wall, the content may be transformed (e.g., stretched, skewed, rotated, etc.) to appear to be placed on the wall.

The actions or descriptions of FIG. 5 may be used with any other embodiment of this disclosure. In addition, the actions and descriptions described in relation to FIG. 5 may be done in suitable alternative orders or in parallel to further the purposes of this disclosure.

Figure 6:
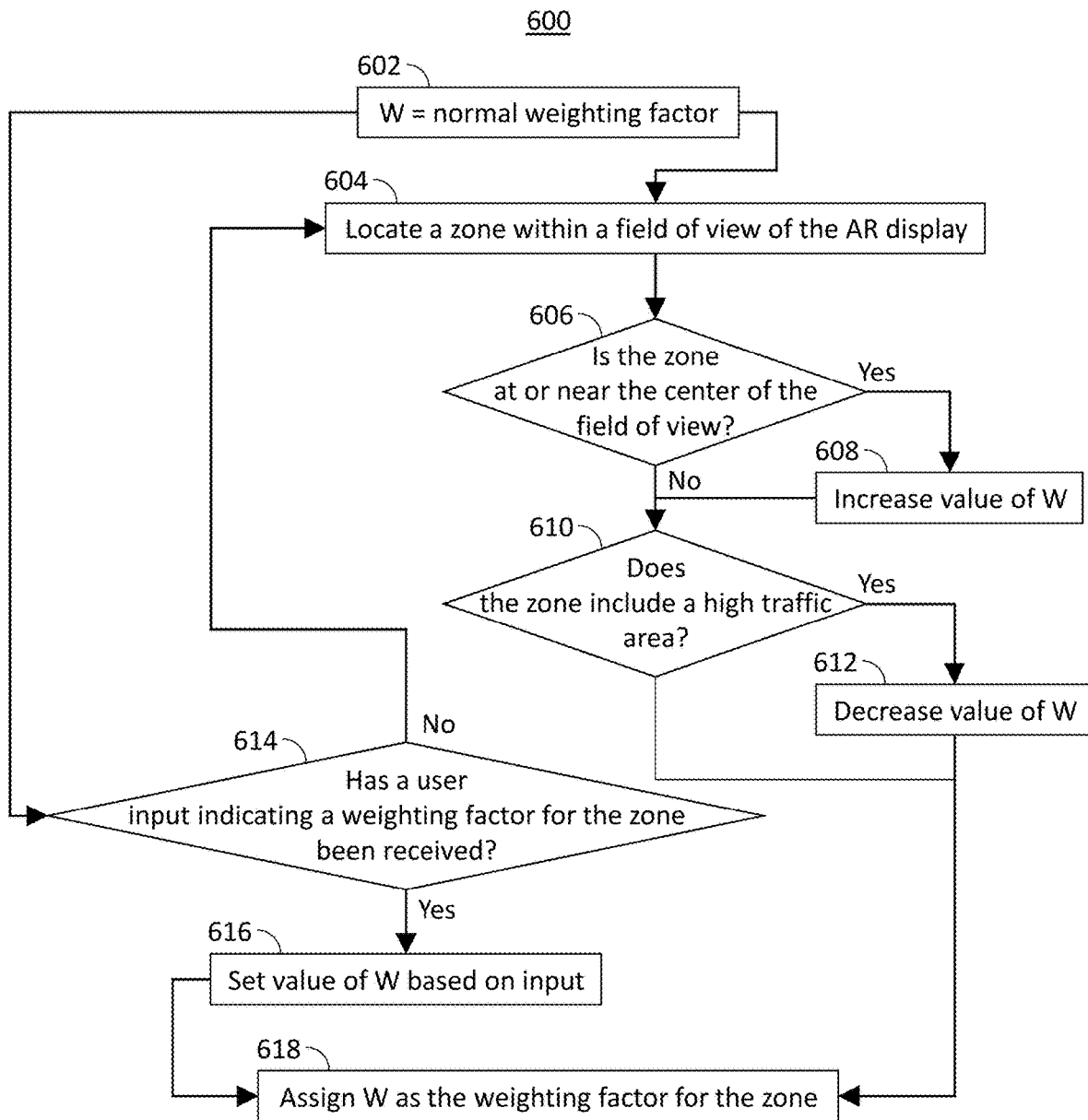
FIG. 6 is a flowchart representing an illustrative process for assigning a weighting factor to a zone of an AR display configuration, in accordance with some embodiments of the disclosure.

FIG. 6 is a flowchart representing an illustrative process 600 for assigning a weighting factor to a zone of an AR display configuration, in accordance with some embodiments of the disclosure. Process 600 may be implemented on control circuitry 408. In addition, one or more actions of process 600 may be incorporated into or combined with one or more actions of any other process or embodiment described herein.

At 602, control circuitry 408 initializes, for a first zone, a variable W, setting its value to that of a normal weighting factor. For example, weighting factors may have values from 0 to 2, with 2 being the highest weight and 0 being the lowest weight. W may therefore initially be set to a value of 1. At 604, control circuitry 408 locates the zone within a field of view of the AR display. Weighting factors may be altered depending on their location within the field of view. Control circuitry 408 may therefore determine whether the zone is located in a central position, a peripheral position, or somewhere in between. Control circuitry 408 may determine a coordinate of the center of the field of view, relative to a reference position, and compare the position of the anchor point of the zone to the coordinate of the center of the field of view. At 606, control circuitry 408 determines whether the zone is at or near the center of the field of view. For example, control circuitry 408 may determine whether the anchor point of the zone is within a threshold distance or number of pixels from the center of the field of view. If so ("Yes" at 606), then, at 608, control circuitry 408 increases the value of W. The amount by which the value of W is increased may depend on how close the anchor point is to the center of the field of view. If the zone is not close to the center of the field of view ("No" at 606), or after increasing the value of W, at 610, control circuitry 408 determines whether the zone includes a high traffic area. For example, the zone may be placed on a wall in an area of a room that other people walk through often. It may be less desirable to place content in such areas. If the zone includes a high traffic area ("Yes" at 610), then, at 612, control circuitry 408 decreases the value of W. The amount by which the value of W is decreased may depend on the amount of traffic or other distractions that are normally present in the area of the zone.

In some cases, after initializing W, at 614, control circuitry 408 checks whether a user input indicating a weighting factor for the zone has been received. For example, during AR display configuration setup, a user may have manually assigned weighting factors to one or more zones. If no inputs indicating a weighting factor for the zone have been received ("No" at 614), then processing continues with 604, as above. If an input has been received ("Yes" at 614), then, at 616, control circuitry 408 sets the value of W based on the input. For example, the input may not have specified an exact value for the weighting factor, but rather a user-friendly value, such as "high" or "low" or a ranking such as 4 of 5 stars. Control circuitry 408 may convert the indicated value to a weighting factor. Once the value of W has been set, at 618, control circuitry 408 assigns the value of W as the weighting factor for the zone.

The actions or descriptions of FIG. 6 may be used with any other embodiment of this disclosure. In addition, the actions and descriptions described in relation to FIG. 6 may be done in suitable alternative orders or in parallel to further the purposes of this disclosure.

Figure 7:
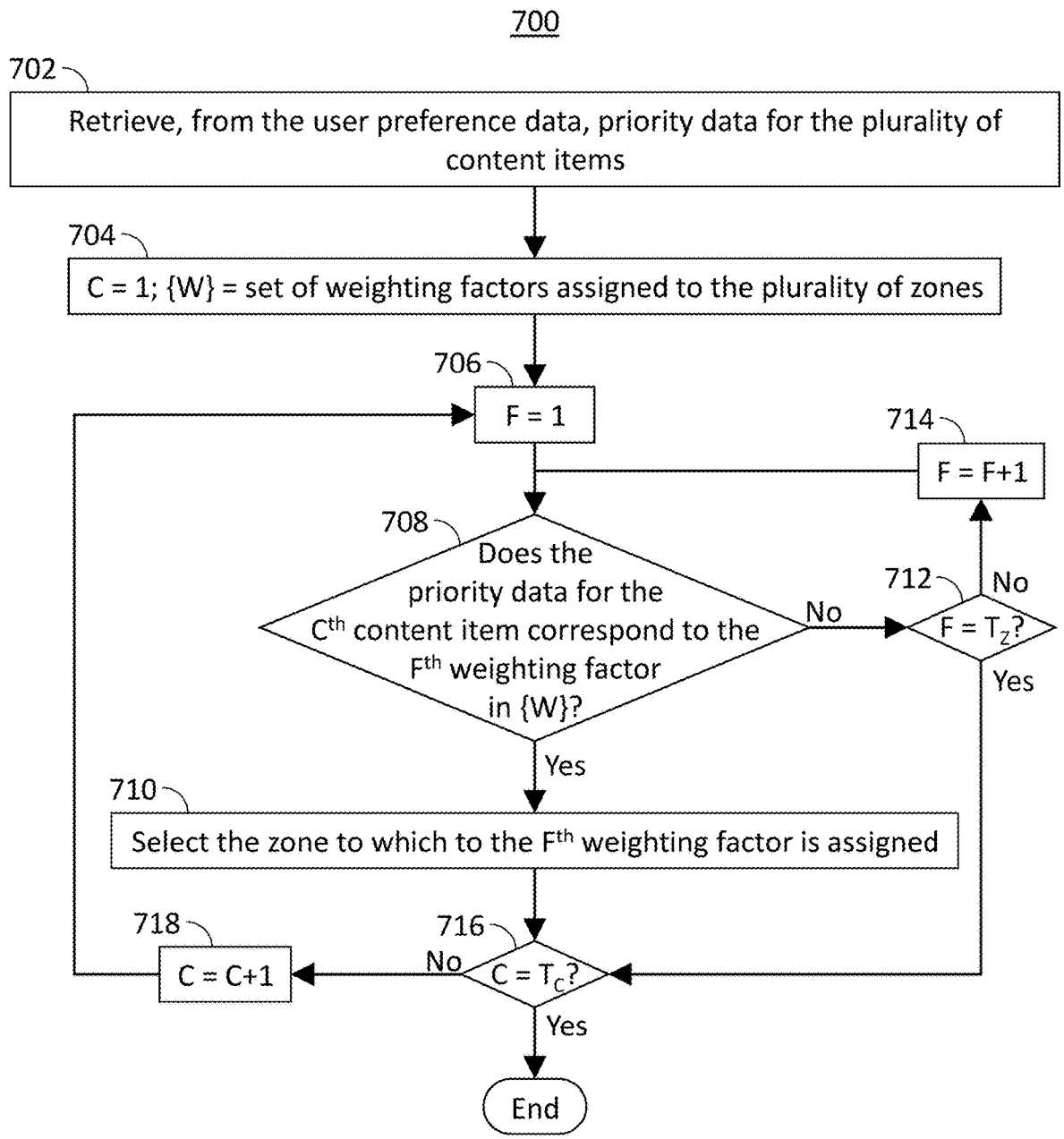
FIG. 7 is a flowchart representing an illustrative process for assigning content items to different zones, in accordance with some embodiments of the disclosure.

FIG. 7 is a flowchart representing an illustrative process 700 for assigning content items to different zones, in accordance with some embodiments of the disclosure. Process 700 may be implemented on control circuitry 408. In addition, one or more actions of process 700 may be incorporated into or combined with one or more actions of any other process or embodiment described herein.

At 702, control circuitry 408 retrieves, from the user preference data, priority data for the plurality of content items. For example, the user preference data may include priority rankings of content type and/or specific content items entered by the user. The user preference data may also include other information from which priority data can be calculated or inferred, such as social media activity related to a content type or content item, content consumption history data indicating that a large amount of content of a specific category has been consumed, etc. Control circuitry 408 may use this information to generate priority data for content items for which the user has not manually, verbally, or otherwise indicated a preference.

At 704, control circuitry 408 initializes a counter variable C, setting its value to one, and an array, list, or other data structure {W} containing the set of weighting factors assigned to the plurality of zones. At 706, control circuitry 408 initializes another counter variable F, setting its value to one. At 708, control circuitry 408 determines whether the priority data for the $C^{th}$ content item corresponds to the $F^{th}$ weighting factor in {W}. Methods for comparing the priority data with the weighting factors are discussed below in connection with FIG. 8. If the priority data of the $C^{th}$ content item corresponds to the $F^{th}$ weighting factor ("Yes" at 708), then, at 710, control circuitry 408 selects the zone to which the $F^{th}$ weighting factor is assigned. In some embodiments, if a specific category of content is assigned to the selected zone, a different zone may be selected following the same process. In other embodiments, multiple zones may be associated with the same category of content, and {W} may be restricted to the zones.

If the priority data for the $C^{th}$ content item does not correspond to the $F^{th}$ weighting factor ("No" at 708), then, at 712, control circuitry 408 determines whether F is equal to $T_Z$, meaning that the priority data of the $C^{th}$ content item has been compared with the weighting factor for every zone. If F is not equal to $T_Z$ ("No" at 712), then, at 714, control circuitry 408 increments the value of F by one, and processing returns to 708. If F is equal to $T_Z$ ("Yes" at 712), or after selecting a zone, at 716, control circuitry 408 determines whether C is equal to $T_C$, meaning that the priority data for all content items has been processed. If C is not equal to $T_C$ ("No" at 716), then, at 718, control circuitry 408 increments the value of C by one, and processing returns to 706, where control circuitry 408 resets the value of F to one. If C is equal to $T_C$ ("Yes" at 716), then the process ends.

The actions or descriptions of FIG. 7 may be used with any other embodiment of this disclosure. In addition, the actions and descriptions described in relation to FIG. 7 may be done in suitable alternative orders or in parallel to further the purposes of this disclosure.

Figure 8:
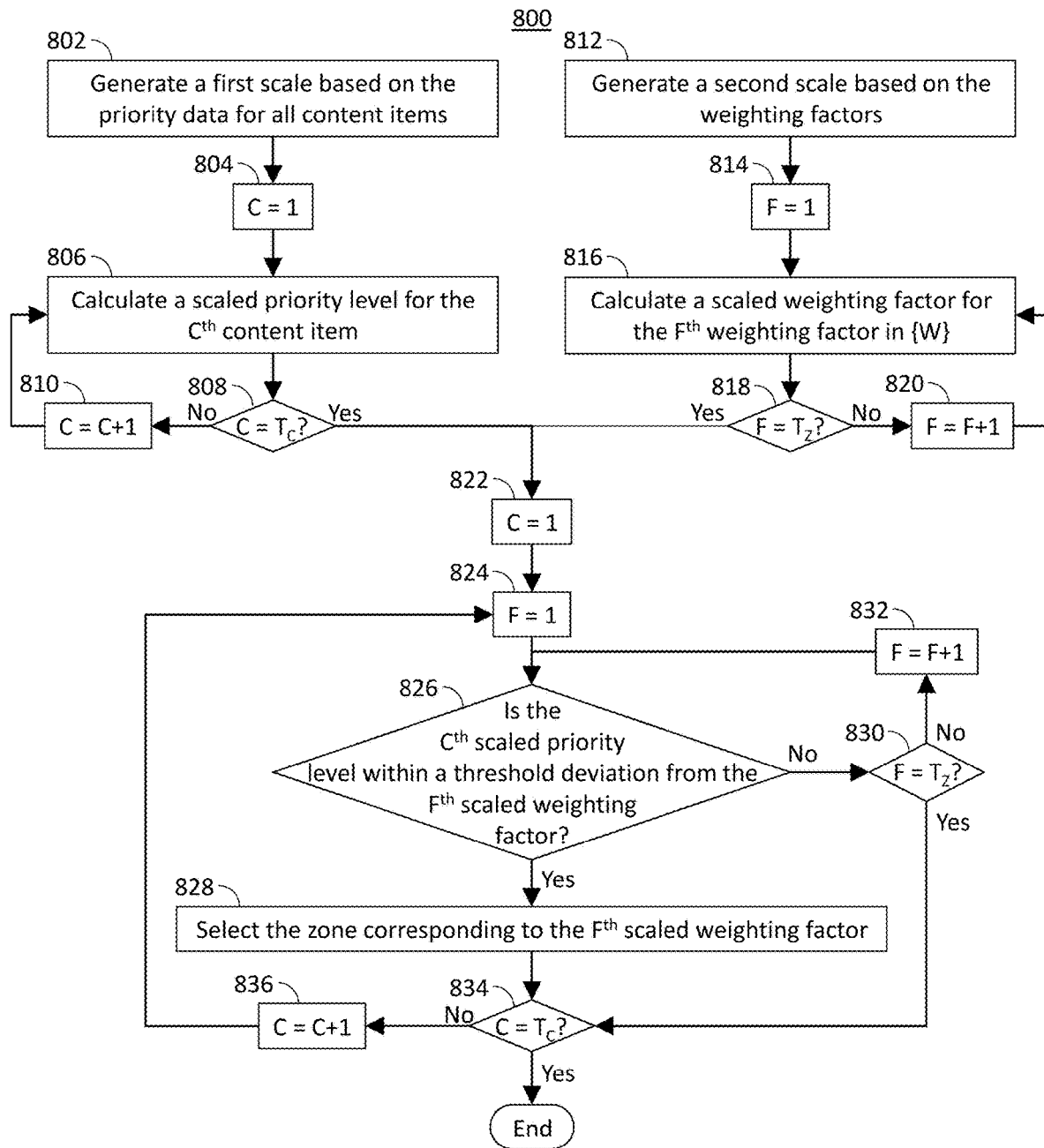
FIG. 8 is a flowchart representing an illustrative process for scaling priority levels and weighting factors for comparison, in accordance with some embodiments of the disclosure.

FIG. 8 is a flowchart representing an illustrative process 800 for scaling priority levels and weighting factors for comparison, in accordance with some embodiments of the disclosure. Process 800 may be implemented on control circuitry 408. In addition, one or more actions of process 800 may be incorporated into or combined with one or more actions of any other process or embodiment described herein.

At 802, control circuitry 408 generates a first scale based on the priority data for all content items to be included in the AR display. For example, control circuitry 408 may generate a scale based on the highest and lowest priority levels of the content items (e.g., a scale from 0 to 5). At 804, control circuitry 408 initializes a counter variable C, setting its value to one. At 806, control circuitry 408 calculates a scaled priority level for the $C^{th}$ content item. For example, the difference between the highest and lowest values on the scale is calculated. The raw value to be scaled is then multiplied by the inverse of the difference. For example, using a scale from 0 to 5, a priority level of 4 yields a scaled priority level of 0.8. The difference between maximum and minimum values of the scale is 5. Multiplying 4 by ⅕ gives a scaled value of 0.8. At 808, control circuitry 408 determines whether C is equal to $T_C$, meaning that a scaled priority level has been calculated for all content items. If not ("No" at 808), then, at 810, control circuitry 408 increments the value of C by one, and processing returns to 806.

At 812, control circuitry 408 generates a second scale based on the weighting factors assigned to the zones of the AR display configuration. Similar to the first scale, the second scale may be generated based on the highest and lowest weighting factors. At 814, control circuitry 408 initializes a counter variable F, setting its value to one. At 816, control circuitry calculates a scaled weighting factor for the $F^{th}$ weighting factor in {W}. For example, a weighting factor of 0.75 on a scale from 0.5 to 2 results in a scaled weighting factor of 0.5. The difference between the maximum and minimum values of the scale is 1.5 and multiplying 0.75 by 1/1.5 results in a scaled value of 0.5. At 818, control circuitry 408 determines whether F is equal to $T_Z$, meaning that scaled weighting factors have been calculated for all zones. If not ("No" at 818), then, at 820, control circuitry 408 increments the value of F by one, and processing returns to 816. It is noted that actions 802-810 may be executed simultaneously with actions 812-820.

After all scaled priority levels have been calculated ("Yes" at 808) and all scaled weighting factors have been calculated ("Yes" at 818), at 822, control circuitry 408 resets the value of C to one. At 824, control circuitry 408 resets the value of F to one. At 826, control circuitry 408 determines whether the $C^{th}$ scaled priority level is within a threshold deviation from the $F^{th}$ scaled weighting factor. The threshold deviation may be, for example, 0.2. Thus, if the $C^{th}$ scaled priority level is 0.6 and the $F^{th}$ scaled weighting factor is 0.7, then the $C^{th}$ scaled priority level is within the threshold deviation from the $F^{th}$ scaled weighting factor.

If the $C^{th}$ scaled priority level is within the threshold deviation from the $F^{th}$ weighting factor ("Yes" at 826), then, at 828, control circuitry 408 selects the zone corresponding to the $F^{th}$ weighting factor. If the $C^{th}$ scaled priority level is not within the threshold deviation from the $F^{th}$ scaled weighting value ("No" at 826), then, at 830, control circuitry determines whether F is equal to $T_Z$, meaning that the $C^{th}$ scaled priority level has been compared with all scaled weighting factors. If F is not equal to $T_Z$ ("No" at 830), then, at 832, control circuitry 408 increments the value of F by one, and processing returns to 826.

If F is equal to $T_Z$ ("Yes" at 830), or after selecting the zone corresponding to the $F^{th}$ scaled weighting factor, at 834, control circuitry determines whether C is equal to $T_C$, meaning that the scaled priority level of all content items has been compared with the scaled weighting factors. If C is not equal to $T_C$ ("No" at 834), then, at 836, control circuitry 408 increments the value of C by one, and processing returns to 824, where control circuitry 408 resets the value of F to one. If C is equal to $T_C$ ("Yes" at 834), then the process ends.

The actions or descriptions of FIG. 8 may be used with any other embodiment of this disclosure. In addition, the actions and descriptions described in relation to FIG. 8 may be done in suitable alternative orders or in parallel to further the purposes of this disclosure.

Figure 9:
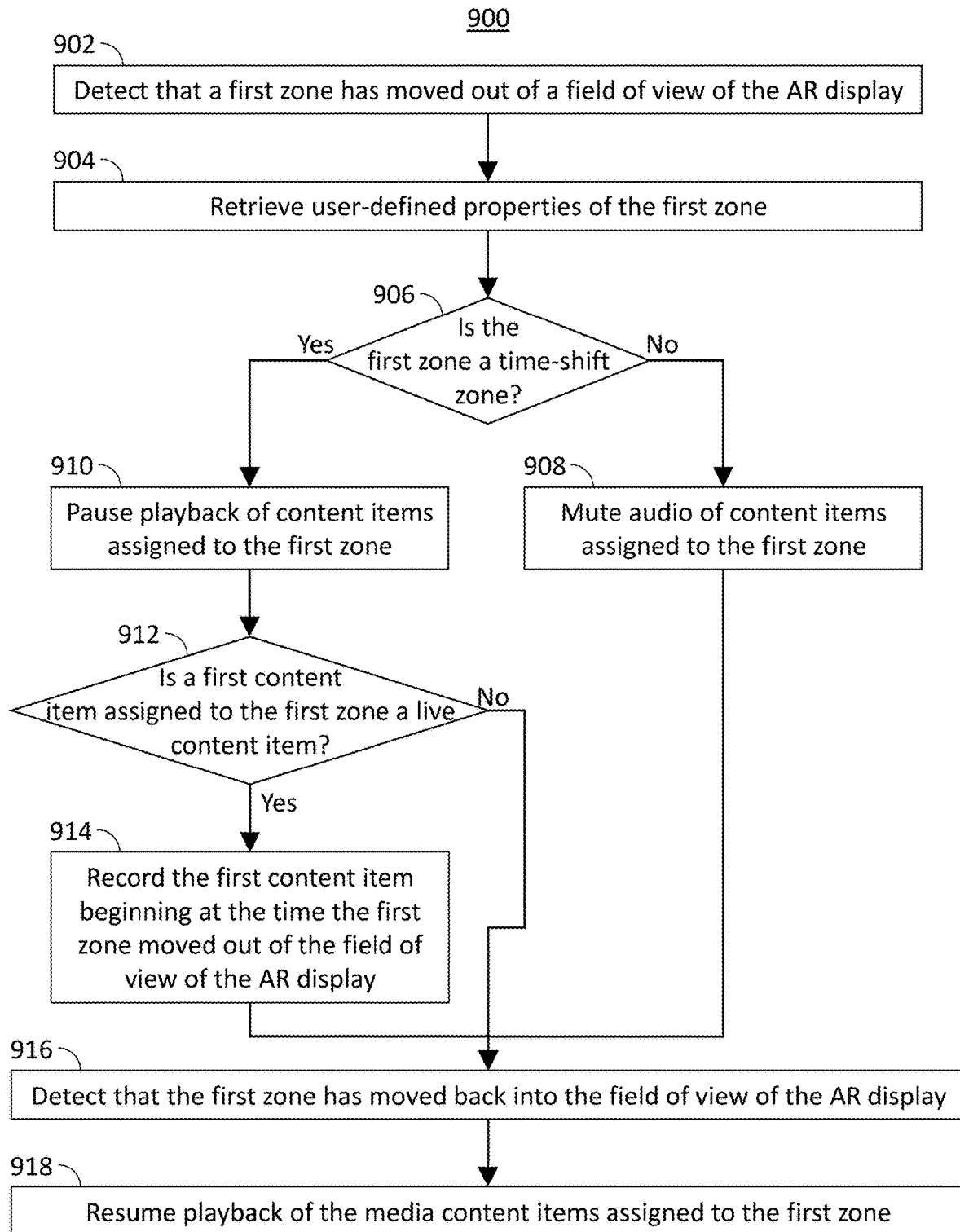
FIG. 9 is a flowchart representing an illustrative process for pausing and resuming playback of content items in a zone in response to movement of the zone relative to a field of view of the AR display device, in accordance with some embodiments of the disclosure.

FIG. 9 is a flowchart representing an illustrative process 900 for pausing and resuming playback of content items in a zone in response to movement of the zone relative to a field of view of the AR display device, in accordance with some embodiments of the disclosure. Process 900 may be implemented on control circuitry 408. In addition, one or more actions of process 900 may be incorporated into or combined with one or more actions of any other process or embodiment described herein.

At 902, control circuitry 408 detects that a first zone has moved out of a field of view of the AR display. For example, control circuitry 408 may receive data from one or more accelerometers, inertial measurement units, compasses, gyroscopes, or other motion detection circuitry to track movement of the AR display device within the location. Control circuitry 408 may also use imaging sensors to track the perceived movement of objects or anchor points within the location as the AR display device moves. The position of each zone currently being displayed may thus be tracked by control circuitry 408 to allow for updating of the displayed position of each zone. This keeps each zone centered on its anchor point. The coordinates of each anchor point, or of the outer edge of each zone, may be tracked and compared against a range of coordinates covered by the field of view of the AR display device or against a pixel coordinate of the AR display. If the edge of a zone moves beyond the field of view by a threshold amount (e.g., at least one third of the zone), or if the anchor point moves beyond the field of view, control circuitry 408 may determine that the zone has moved out of the field of view.

At 904, control circuitry 408 retrieves user-defined properties of the first zone. For example, during setup of the AR display configuration, the user may have selected specific options for each zone, such as size, position, priority, content category, and whether the zone is a time-shift zone. At 906, control circuitry 408 determines whether the zone is a time-shift zone based on the user-defined properties of the zone. If the zone is not a time-shift zone ("No" at 906), then, at 908, control circuitry 408 mutes or otherwise discontinues output of the audio of content items assigned to the zone. Control circuitry 408 may also cease rendering of the content items assigned to the zone to reduce processor load and system resource usage. Control circuitry 408 may also end any streaming sessions for content being streamed from an IP content source to reduce network bandwidth usage.

If the zone is a time-shift zone ("Yes" at 906), then, at 910, control circuitry 408 pauses playback of content items assigned to the first zone. At 912, control circuitry 408 determines whether a content item assigned to the zone is a live content item (as opposed to a VOD content item). For example, control circuitry 408 may access EPG data for each content item assigned to the zone and determine, from the EPG data, whether the content item is a live broadcast (or multicast) content item, such as a sports event. If a content item assigned to the first zone is a live content item, ("Yes" at 912), then, at 914, control circuitry 408 records the content item beginning at the time the first zone moved out of the field of view of the AR display. The content may be recorded locally in a memory of the AR display device, or on a cloud storage system.

After muting (at 908) audio of content items of a non-time-shift zone, after beginning (at 914) recording of content items in a time-shift zone, or if no content items assigned to the zone are live content items ("No" at 912), at 916, control circuitry 408 detects that the first zone has moved back into the field of view of the AR display. This may be accomplished using the same methods described above to detect if the first zone has moved out of the field of view of the AR display. If the zone has moved back into the field of view, at 918, control circuitry 408 resumes playback of the content items assigned to the first zone. If the zone is not a time-shift zone, control circuitry 408 may reconnect a streaming session with an IP content source, or resume receipt of content from a broadcast source. In some embodiments, if live content is assigned to a non-time-shift zone, the live content may continue playing with a reduced weighting factor. For example, the audio of the live content may be deactivated and the AR virtual TV on which it is displayed may be temporarily relocated to a static location in the periphery of the user's field of view. When the zone to which the live content is assigned reenters the field of view, the AR virtual TV is relocated to the assigned zone, and the previous weighting factor of the live content is restored. If the zone is a time-shift zone, control circuitry 408 may resume playback beginning with the recorded portion of the content. Control circuitry 408 may continue recording the content until playback of the content items reaches the live playback point of the content items.

The actions or descriptions of FIG. 9 may be used with any other embodiment of this disclosure. In addition, the actions and descriptions described in relation to FIG. 9 may be done in suitable alternative orders or in parallel to further the purposes of this disclosure.

Figure 10:
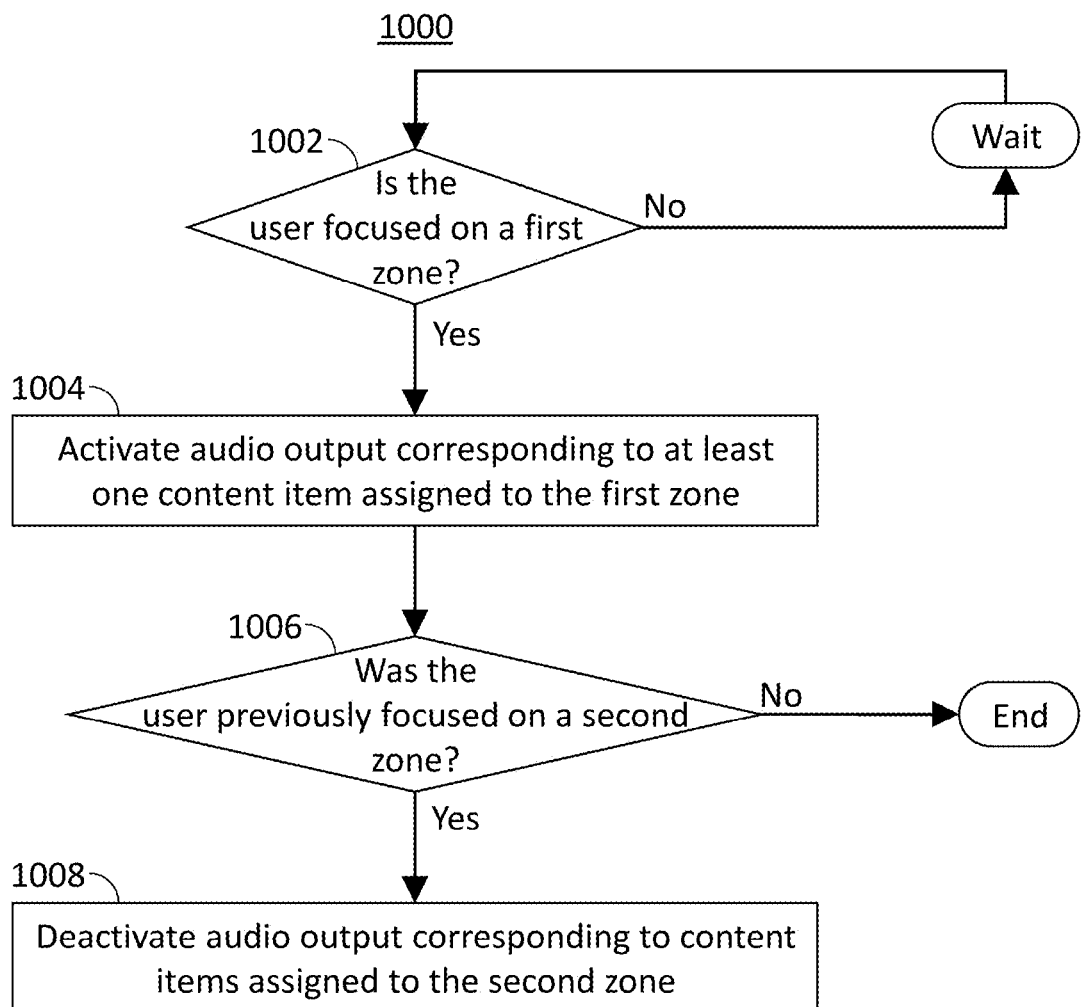
FIG. 10 is a flowchart representing an illustrative process for activating and deactivating audio of content items based on the zone on which the user is currently focused, in accordance with some embodiments of the disclosure.

FIG. 10 is a flowchart representing an illustrative process 1000 for activating and deactivating audio of content items based on the zone on which the user is currently focused, in accordance with some embodiments of the disclosure. Process 1000 may be implemented on control circuitry 408. In addition, one or more actions of process 1000 may be incorporated into or combined with one or more actions of any other process or embodiment described herein.

At 1002, control circuitry 408 determines whether the user is focused on a first zone. For example, control circuitry 408 may track the gaze of the user or the head orientation of the user, or may use any other suitable method for determining whether the user's attention is focused. If the user is not focused on any zone ("No" at 1002), then control circuitry 408 may wait until focus on a particular zone is detected. If the user is detected to be focused on the first zone ("Yes" at 1002), then, at 1004, control circuitry 408 activates audio output corresponding to at least one content item assigned to the first zone. For example, if only one content is assigned to the first zone, audio output of that content item is activated. If multiple content items are assigned to the first zone, control circuitry 408 may output audio of all content items simultaneously, or may narrow a determination of the user's gaze to identify a single content item on which the user is focused and activate audio output of only that content item. In some embodiments, the audio of one content item may be selected, based on content priority, content preferences of the user, or the user's gaze. The selected audio may then be output. Audio of other content items assigned to the zone may also be output simultaneously, but at a reduced volume. This may allow the user to hear audio of the other content items and shift focus to another content item in response to an audio cue, such as applause, cheering, music, etc. The audio of that content item may then be selected for output, with the previously selected audio being muted or output at a lower volume.

At 1006, control circuitry 408 determines whether the user was previously focused on a second zone. If not ("No" at 1006), then the process ends. If so ("Yes" at 1006), then, at 1008, control circuitry 408 deactivates audio output corresponding to content items assigned to the second zone. Alternatively, control circuitry 408 may continue to output audio of those content items at reduced volume as described above. In some cases, the volume may be reduced further than that of content items assigned to the zone of focus but on which the user is not specifically focused.

The actions or descriptions of FIG. 10 may be used with any other embodiment of this disclosure. In addition, the actions and descriptions described in relation to FIG. 10 may be done in suitable alternative orders or in parallel to further the purposes of this disclosure.

Figure 11:
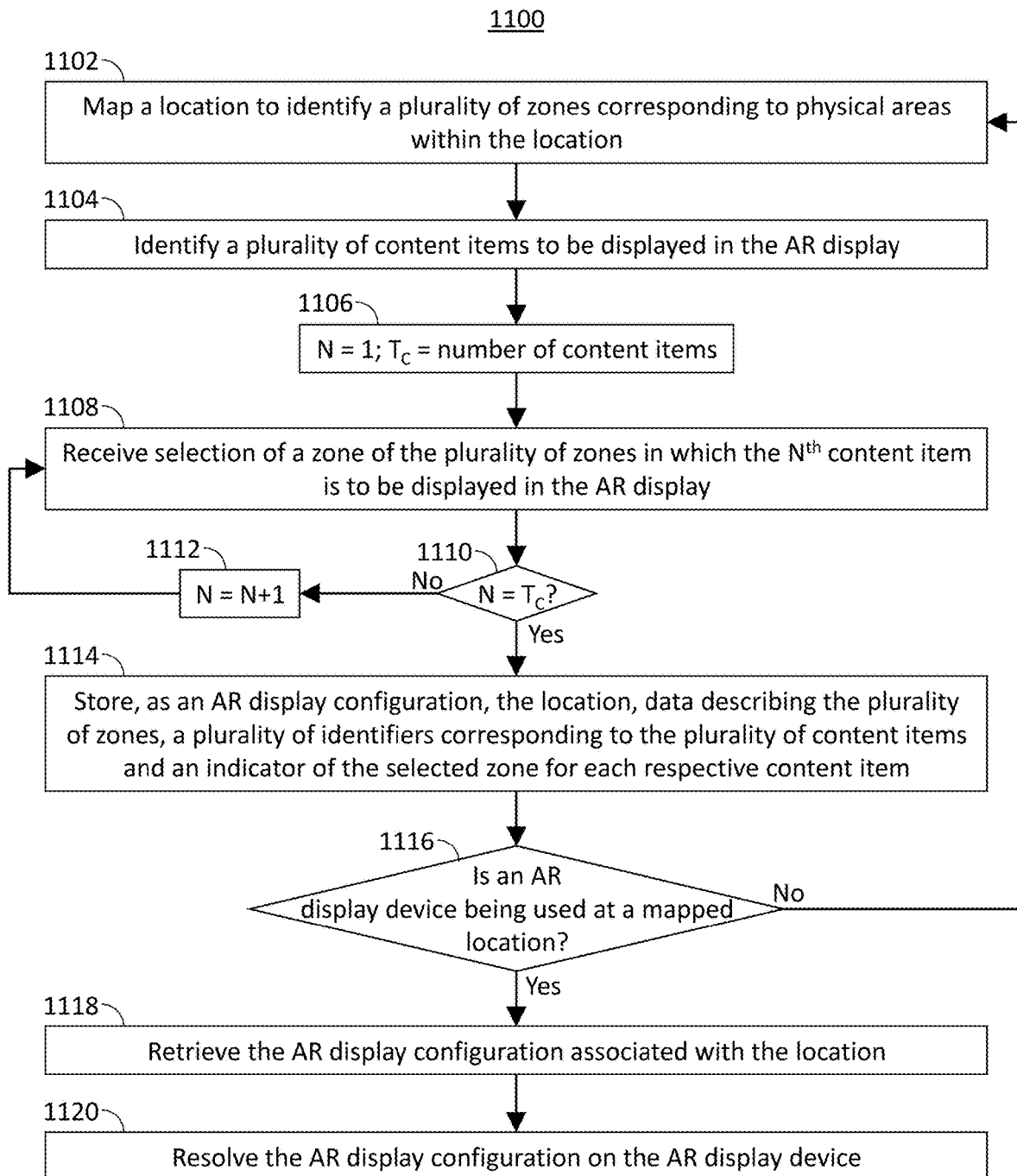
FIG. 11 is a flowchart representing an illustrative process for setting up an AR display configuration, in accordance with some embodiments of the disclosure.

FIG. 11 is a flowchart representing an illustrative process 1100 for setting up an AR display configuration, in accordance with some embodiments of the disclosure. Process 1100 may be implemented on control circuitry 408. In addition, one or more actions of process 1100 may be incorporated into or combined with one or more actions of any other process or embodiment described herein.

At 1102, control circuitry 408 maps a location to identify a plurality of zones corresponding to physical areas within the location. The location may be mapped using imaging sensors, such as cameras, infrared sensors, light ranging sensors, and any other suitable sensors to fully map a three-dimensional space surrounding the AR display device. Zones within the location may be identified as areas within the mapped space that may be obstructed from the view of the user without endangering the user's ability to move around the location. For example, a piece of furniture in the middle of a room, such as a table, may not be suitable for obstruction, as the user may accidentally walk into the table. However, a bookshelf against a wall would be suitable for obstruction, as the user is not likely to walk into it. Doorways may also not be suitable for obstruction, as the user may need to be able to see what is happening in another room and may need to know where the exits to the room are in case of emergency. During setup of an AR display configuration, zones may be identified in a 360-degree field around the AR display device, with only a subset of identified zones visible in the field of view of the AR display device at any one time.

At 1104, control circuitry 408 identifies a plurality of content items to be displayed in the AR display. For example, control circuitry 408 may receive input from a user indicating specific content items, content series, or content categories to be displayed in the AR display. Control circuitry 408 may, alternatively, or additionally, access user preference data and/or user content consumption history to identify content items that the user prefers. Control circuitry 408 may then select one or more content items to be included in the AR display.

At 1106, control circuitry 408 initializes a counter variable N, setting its value to one, and a variable $T_C$ representing the number of content items to be included in the AR display. At 1108, control circuitry receives selection of a zone of the plurality of zones in which the $N^{th}$ content item is to be displayed in the AR display. For example, control circuitry 408 may present the user with an option, for each content item, to assign the content item to a specific zone. Selection of zone may also be received from an automated process which may, for example, group selected content items by category (e.g., genre), and assign each group to a zone. At 1110, control circuitry 408 determines whether N is equal to $T_C$, meaning that all content items have been assigned to a zone. If not ("No" at 1110), then, at 1112, control circuitry 408 increments the value of N by one, and processing returns to 1108.

If N is equal to $T_C$ ("Yes" at 1110), then, at 1114, control circuitry 408 stores, as an AR display configuration, the location data describing the plurality of zones, a plurality of identifiers corresponding to the plurality of content items and an indicator of the selected zone for each respective content item. For example, control circuitry may generate a data structure including the location; for each respective zone, coordinates of an anchor point for the respective zone and/or boundary coordinates of the respective zone in relation to a reference point and an identifier of the respective zone; and, for each respective content item, an identifier of the respective content item and the identifier of the zone to which the respective content item is assigned.

At 1116, control circuitry 408 determines whether an AR display device is being used at a mapped location. For example, control circuitry 408 may obtain location data from a GPS module of the AR display device and compare the location data to locations associated with stored AR display configurations. If the location data places the AR display device within a threshold distance, such as 10 feet, of the location associated with a stored AR display configuration, control circuitry 408 may determine that the AR display device is being used at that location. If the AR display device is not being used at a location that is mapped ("No" at 1116), processing may return to 1102, where the location is mapped, and a new AR display configuration may be set up.

If the AR display device is being used at a mapped location ("Yes" at 1116), then, at 1118, control circuitry 408 retrieves the AR display configuration associated with the location. At 1120, control circuitry 408 resolves the AR display configuration on the AR display device. For example, control circuitry 408 locates the plurality of zones defined in the AR display configuration and initializes a number of AR virtual TV displays in each zone corresponding to the number of content items assigned to the zone. If specific positions within the zone were selected for any content items, the AR virtual TV displays are positioned accordingly. Otherwise, control circuitry 408 places the AR virtual TV displays within the zone such that all displays are initially visible to the user (i.e., without overlapping each other). Control circuitry 408 may also access content items assigned to each zone, or identify content items matching a content category assigned to a zone. Control circuitry 408 then identifies the zone or zones currently within the field of view of the AR display device and begins rendering of the content items assigned to those zones.

The actions or descriptions of FIG. 11 may be used with any other embodiment of this disclosure. In addition, the actions and descriptions described in relation to FIG. 11 may be done in suitable alternative orders or in parallel to further the purposes of this disclosure.

Figure 12:
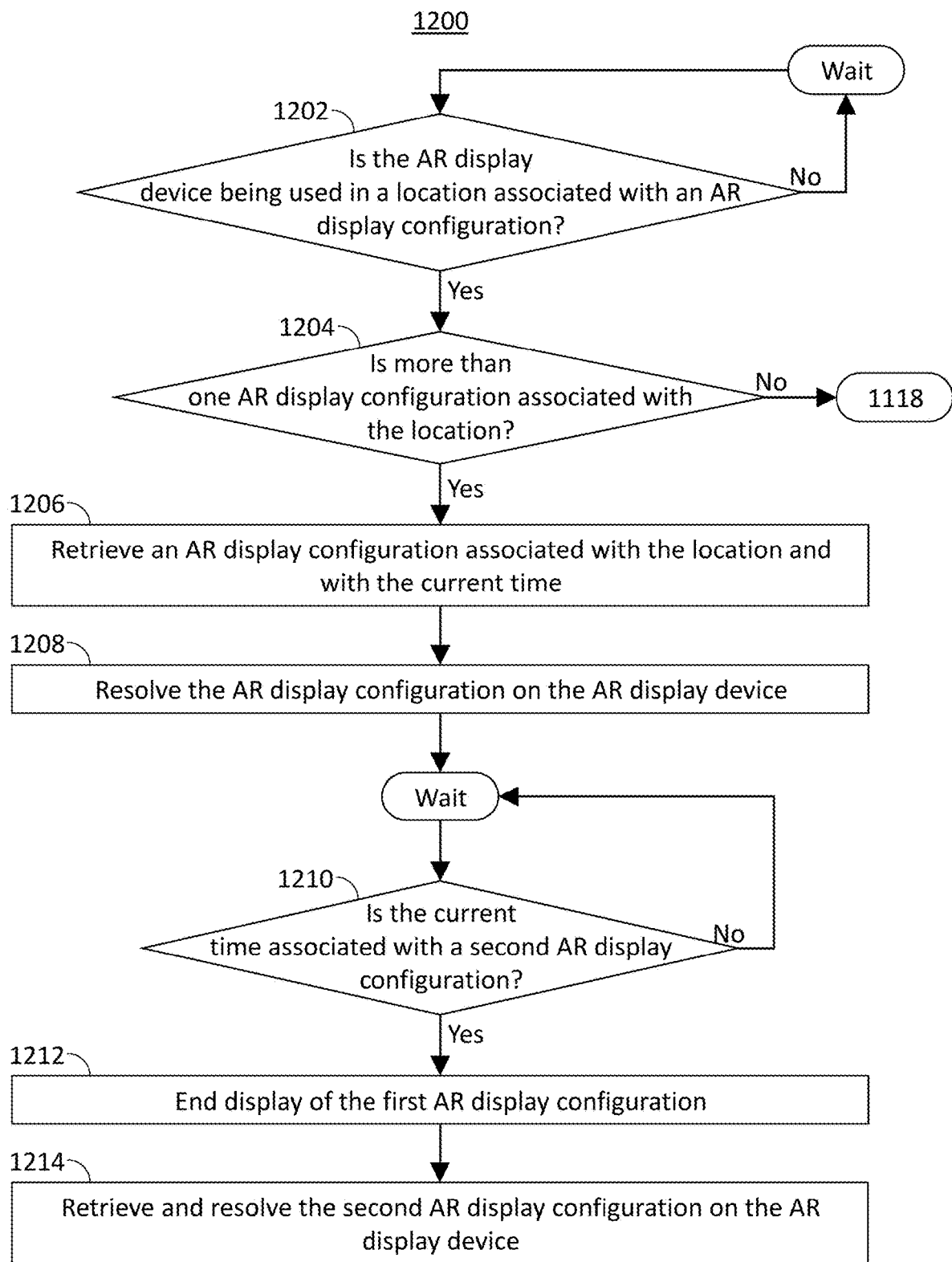
FIG. 12 is a flowchart representing an illustrative process for selecting an AR display configuration for display, in accordance with some embodiments of the disclosure.

FIG. 12 is a flowchart representing an illustrative process 1200 for selecting an AR display configuration for display, in accordance with some embodiments of the disclosure. Process 1200 may be implemented on control circuitry 408. In addition, one or more actions of process 1200 may be incorporated into or combined with one or more actions of any other process or embodiment described herein.

At 1202, control circuitry 408 determines whether the AR display is being used in a location associated with an AR display configuration. This may be accomplished using methods described above in connection with FIG. 11. If the AR display device is not being used in a location associated with an AR display configuration ("No" at 1202), then control circuitry 408 may wait a predetermined amount of time before returning to 1202.

If the AR display device is being used at a location associated with an AR display configuration ("Yes" at 1202), then, at 1204, control circuitry 408 determines whether there is more than one AR display configuration associated with the location. For example, a single user may also set up different AR display configurations for different types of content, different times of day, different days of the week, etc. In some embodiments, different users may also set up personalized AR display configurations for the same location. If only one AR display configuration is associated with the location ("No" at 1204), then processing continues at 1118. If more than one AR configuration set up by the same user is associated with the location ("Yes" at 1204), then, at 1206, control circuitry 408 retrieves an AR display configuration associated with the location and with the current time. For example, control circuitry 408 retrieves the current time from a local real-time clock or retrieves the current time from a time server. Control circuitry 408 then determines whether the current time falls within a time window defined for each AR display configuration associated with the location. For example, each AR display configuration may include a start time and an end time. Control circuitry 408 compares the current time with the start time and end time of each AR display configuration associated with the location. If the current time is after the start time and before the end time of an AR display configuration or if the AR display configuration is not associated with a time, control circuitry 408 retrieves that AR display configuration. At 1208, control circuitry 408 resolves the AR display configuration on the AR display device. This may be accomplished using methods described above in connection with FIG. 11.

Control circuitry 408 then waits a period of time before checking the current time again. For example, control circuitry 408 may retrieve the current time every five minutes. At 1210, control circuitry 408 determines whether the current time is associated with a different AR display configuration. Control circuitry 408 may compare the current time with start and end times of each AR display configuration associated with the location as before. If the current time is still within the time window defined by the AR display configuration currently resolved on the AR display ("No" at 1210), then, control circuitry 408 continues to wait until the next time check interval.

If the current time is associated with a different AR display configuration ("Yes" at 1210), then, at 1212, control circuitry 408 ends display of the first AR display configuration. For example, control circuitry 408 stops displaying the content items associated with the AR display configuration, and ends streaming sessions for any content items being received from IP content sources. Then, at 1214, control circuitry 408 retrieves and resolves the AR display configuration associated with the location and the current time, using methods described above.

The actions or descriptions of FIG. 12 may be used with any other embodiment of this disclosure. In addition, the actions and descriptions described in relation to FIG. 12 may be done in suitable alternative orders or in parallel to further the purposes of this disclosure.

Figure 13:
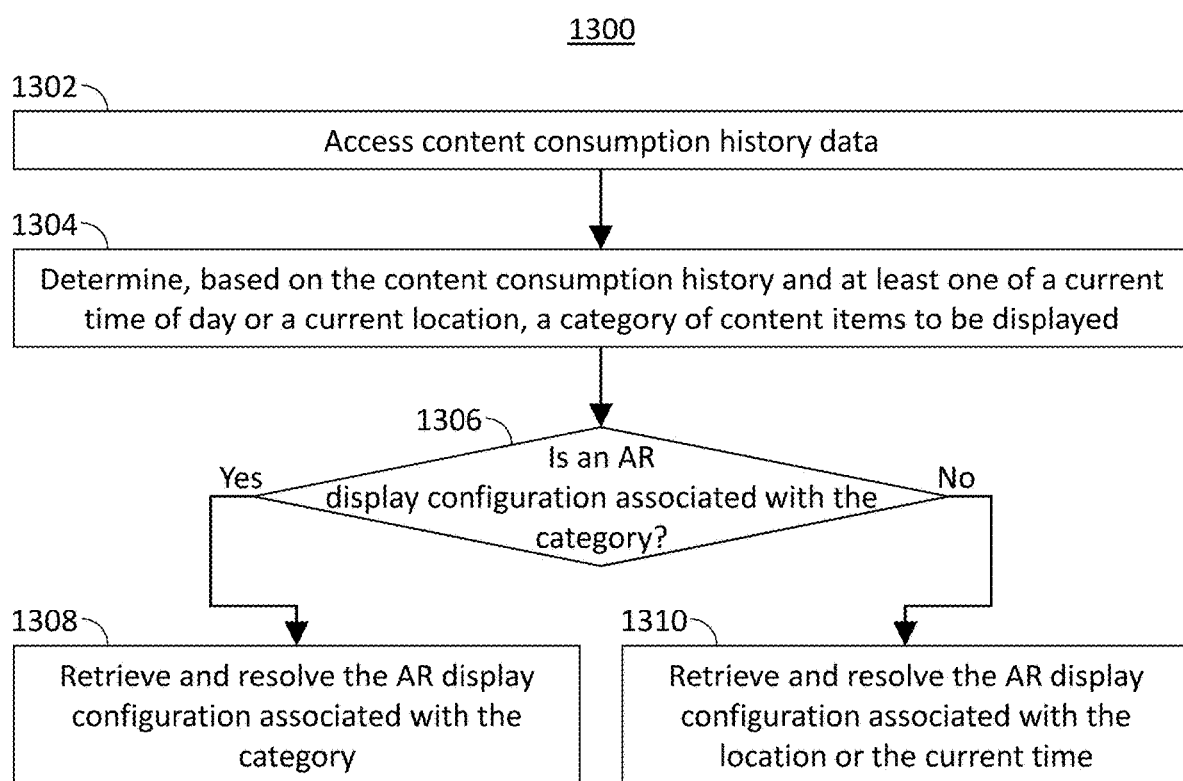
FIG. 13 is a flowchart representing an illustrative process for selecting an AR display configuration for display based on content consumption history, in accordance with some embodiments of the disclosure.

FIG. 13 is a flowchart representing an illustrative process 1300 for selecting an AR display configuration for display based on content consumption history, in accordance with some embodiments of the disclosure. Process 1300 may be implemented on control circuitry 408. In addition, one or more actions of process 1300 may be incorporated into or combined with one or more actions of any other process or embodiment described herein.

At 1302, control circuitry 408 accesses content consumption history data for the user. For example, control circuitry 408 may access a history of content items displayed on the AR display device, as well as content consumed by the user on one or more streaming platforms (e.g., Netflix). Control circuitry 408 may also retrieve data from a cable TV provider account associated with the user to identify content recently and/or frequently consumed by the user, including TV shows, broadcast movies, and VOD or pay-per-view content.

At 1304, control circuitry 408 determines, based on the content consumption history and at least one of a current time of day or a current location, a category of content items to be displayed. For example, control circuitry 408 may determine that, at a first location, the user watches a first category of content on weekday evenings, a second category of content on weekday mornings, and a third category of content on weekends. Control circuitry 408 may also determine that, at a second location, the user watches a fourth category of content every day in the afternoon. Control circuitry 408 may select a category of content, based on the content consumption history, that matches either the current time, the current location, or both.

At 1306, control circuitry 408 determines whether an AR display configuration is associated with the category. For example, control circuitry 408 may determine whether an AR display configuration includes a zone to which the content category, or specific content items matching the category, are assigned. If so ("Yes" at 1306), then, at 1308, control circuitry 408 retrieves and resolves the AR display configuration associated with the category. Otherwise ("No" at 1306), at 1310), control circuitry 408 retrieves and resolves the AR display configuration associated with the location and/or the current time.

The actions or descriptions of FIG. 13 may be used with any other embodiment of this disclosure. In addition, the actions and descriptions described in relation to FIG. 13 may be done in suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for automatically displaying content items in predetermined locations in an augmented reality (AR) display, the method comprising:
    identifying a user of the AR display;
    retrieving data describing a plurality of predefined zones corresponding to different physical areas within a location, each predefined zone of the plurality of predefined zones having been previously defined by the user for future use in the location, and each predefined zone having a corresponding layout wherein the corresponding layout comprises at least one stored relationship between a physical location within the respective zone and metadata of a previously accessed content item;
    assigning a weighting factor to each zone;
    identifying an anchor point for each zone;
    identifying, based on user preference data associated with the user, a plurality of content items to be displayed in the AR display, wherein the user preference data includes priority data for each content item of the plurality of content items;
    assigning each content item to a physical location within a respective zone of the plurality of zones based on (1) the priority data of the content item, (2) the weighting factors of the plurality of zones, (3) the layout corresponding to the respective zone of the plurality of zones, and (4) a distance from the anchor point of the respective zone of the plurality of zones, wherein the distance from the anchor point is determined based on the priority data of the content item; and
    generating for display, in the AR display, each content item of the plurality of content items in the respective zone to which it is assigned, wherein each content item is generated for display in a position within the respective zone based on the corresponding layout for the respective zone.

2. The method of claim 1, wherein assigning a weighting factor to each zone further comprises:
    locating each zone within a field of view of the AR display; and
    selecting a weighting factor for each respective zone based on the location of the respective zone within the field of view.

3. The method of claim 1, wherein assigning a weighting factor to each zone further comprises receiving at least one input indicating a weighting factor for at least one zone.

4. The method of claim 1, wherein assigning each content item to a respective zone of the plurality of zones based on the priority data and the weighting factors further comprises, for each respective content item:
    retrieving, from the priority data, a priority level for the respective content item;
    comparing the priority level to a plurality of weighting factors, each weighting factor having been assigned to a different zone of the plurality of zones; and
    selecting, based on the comparing, a respective zone of the plurality of zones having a weighting factor corresponding to the priority level.

5. The method of claim 4, further comprising comparing the priority level to a plurality of weighting factors by:
    generating a first scale based on the priority data;
    generating a second scale based on the weighting factors;
    calculating a scaled priority level based on the priority level and the first scale;
    calculating a plurality of scaled weighting factors based on the plurality of weighting factors and the second scale; and
    comparing the scaled priority level to the plurality of scaled weighting factors.

6. The method of claim 1, further comprising:
    detecting that a first zone has moved out of a field of view of the AR display; and
    pausing playback of content items assigned to the first zone.

7. The method of claim 6, further comprising:
    detecting that the first zone has moved back into the field of view of the AR display, and
    resuming playback of the content items assigned to the first zone.

8. The method of claim 6, further comprising:
    determining, based on user-defined properties of the first zone, whether the first zone is a time-shift zone;
    wherein pausing playback of content items assigned to the first zone occurs only in response to determining that the first zone is a time-shift zone.

9. The method of claim 1, wherein a physical display device is located in a first zone of the plurality of zones, the method further comprising:
preventing content items from being assigned to the first zone; and
assigning a highest weighting factor to the first zone.

10. The method of claim 1, wherein each content item is first displayed in the AR display without corresponding audio output, the method further comprising:
identifying a target zone on which the user is focused; and
activating the audio output corresponding to at least one content item assigned to the target zone.

11. The method of claim 10, further comprising:
determining whether the user was previously focused on another zone; and
in response to determining that the user was previously focused on another zone, deactivating the audio output corresponding to the another zone.

12. A system for automatically displaying content items in predetermined locations in an augmented reality (AR) display, the system comprising:
input/output circuitry; and
control circuitry configured to:
identify a user of the AR display;
retrieve data describing a plurality of predefined zones corresponding to different physical areas within a location, each predefined zone of the plurality of predefined zones having been previously defined by the user for future use in the location, and each predefined zone having a corresponding layout wherein the corresponding layout comprises at least one stored relationship between a physical location within the respective zone and metadata of a previously accessed content item;
assign a weighting factor to each zone;
identify an anchor point for each zone;
identify, based on user preference data associated with the user, a plurality of content items to be displayed in the AR display, wherein the user preference data includes priority data for each content item of the plurality of content items;
assign each content item to a physical location within a respective zone of the plurality of zones based on (1) the priority data of the content item, (2) the weighting factors of the plurality of zones, (3) the layout corresponding to the respective zone of the plurality of zones, and (4) a distance from the anchor point of the respective zone of the plurality of zones, wherein the distance from the anchor point is determined based on the priority data of the content item; and
generating for display, in the AR display, using the input/output circuitry, each content item of the plurality of content items in the respective zone to which it is assigned, wherein each content item is generated for display in a position within the respective zone based on the corresponding layout or the respective zone.

13. The system of claim 12, wherein the control circuitry configured to assign a weighting factor to each zone is further configured to:
locate each zone within a field of view of the AR display; and
select a weighting factor for each respective zone based on the location of the respective zone within the field of view.

14. The system of claim 12, wherein the control circuitry configured to assign a weighting factor to each zone is further configured to receive, using the input/output circuitry, at least one input indicating a weighting factor for at least one zone.

15. The system of claim 12, wherein the control circuitry configured to assign each content item to a respective zone of the plurality of zones based on the priority data and the weighting factors is further configured to, for each respective content item:
retrieve, from the priority data, a priority level for the respective content item;
compare the priority level to a plurality of weighting factors, each weighting factor having been assigned to a different zone of the plurality of zones; and
select, based on the comparing, a respective zone of the plurality of zones having a weighting factor corresponding to the priority level.

16. The system of claim 15, wherein the control circuitry is further configured to compare the priority level to a plurality of weighting factors by:
generating a first scale based on the priority data;
generating a second scale based on the weighting factors;
calculating a scaled priority level based on the priority level and the first scale;
calculating a plurality of scaled weighting factors based on the plurality of weighting factors and the second scale; and
comparing the scaled priority level to the plurality of scaled weighting factors.

17. The system of claim 12, wherein the control circuitry is further configured to:
detect that a first zone has moved out of a field of view of the AR display; and
pause playback of content items assigned to the first zone.

18. The system of claim 17, wherein the control circuitry is further configured to:
detect that the first zone has moved back into the field of view of the AR display, and
resume playback of the content items assigned to the first zone.

19. The system of claim 17, wherein the control circuitry is further configured to:
determine, based on user-defined properties of the first zone, whether the first zone is a time-shift zone;
wherein the control circuitry configured to pause playback of content items assigned to the first zone is further configured to do so only in response to determining that the first zone is a time-shift zone.

20. The system of claim 12, wherein a physical display device is located in a first zone of the plurality of zones, and wherein the control circuitry is further configured to:
prevent content items from being assigned to the first zone; and
assign a highest weighting factor to the first zone.

21. The system of claim 12, wherein each content item is first displayed in the AR display without corresponding audio output, and wherein the control circuitry is further configured to:
identify a target zone on which the user is focused; and
activate the audio output corresponding to at least one content item assigned to the target zone.

22. The system of claim 21, wherein the control circuitry is further configured to:
determine whether the user was previously focused on another zone; and in response to determining that the user was previously focused on another zone, deactivate the audio output corresponding to the another zone.

* * * * *